Oct. 8, 1940.   R. D. JUNKINS   2,217,637
CONTROL SYSTEM
Filed July 9, 1937   12 Sheets-Sheet 3

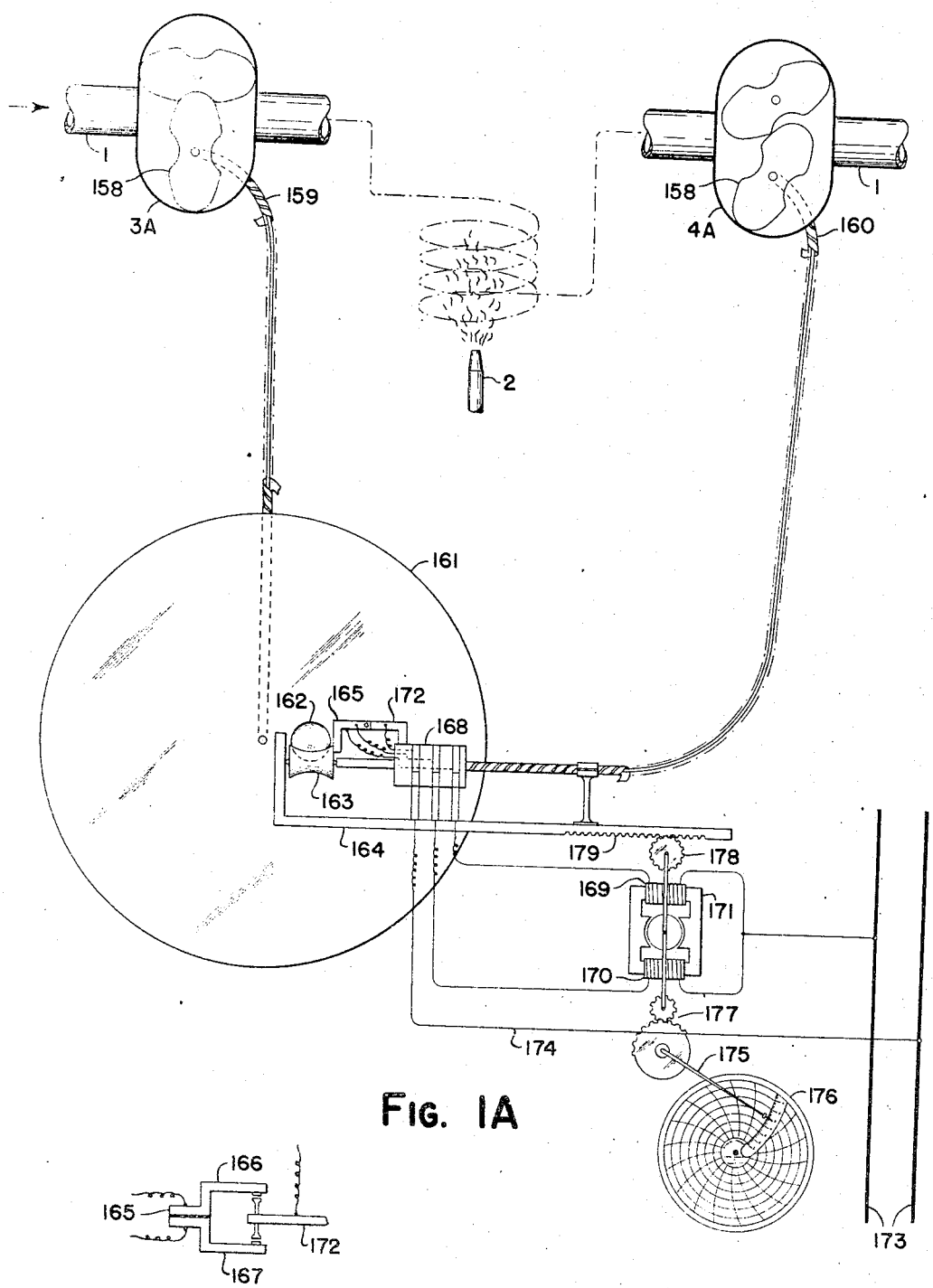

INVENTOR
Raymond D. Junkins
BY
ATTORNEY

Oct. 8, 1940.     R. D. JUNKINS     2,217,637
CONTROL SYSTEM
Filed July 9, 1937     12 Sheets-Sheet 5

INVENTOR
Raymond W. Junkins
BY
ATTORNEY

Oct. 8, 1940.  R. D. JUNKINS  2,217,637
CONTROL SYSTEM
Filed July 9, 1937  12 Sheets-Sheet 7
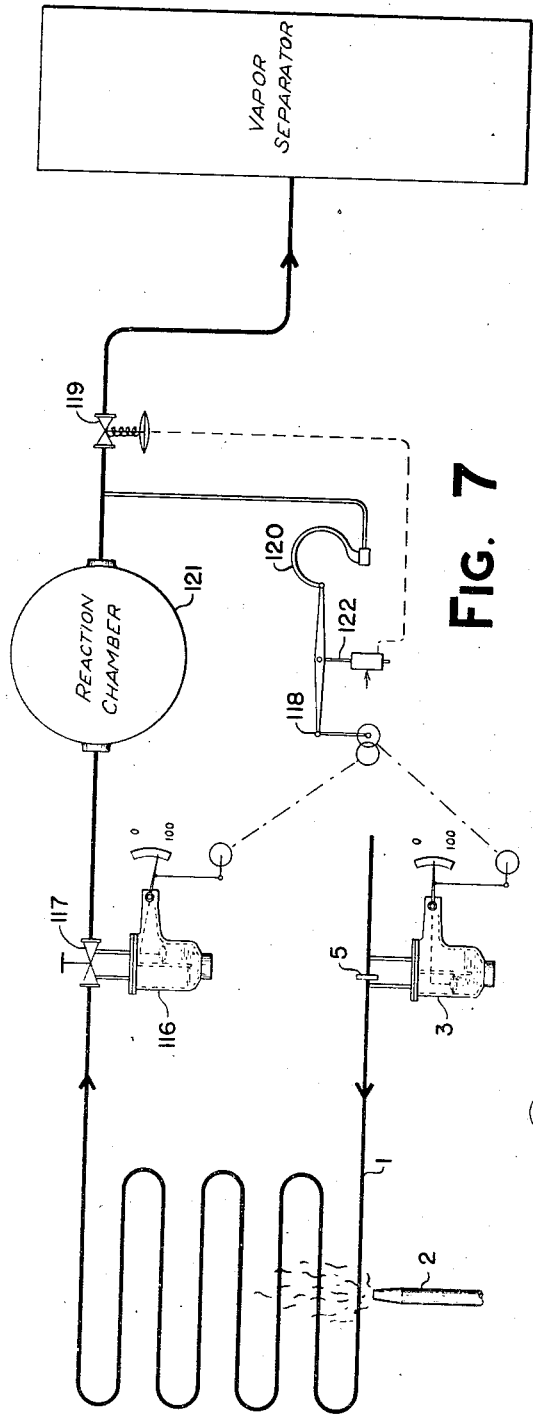
FIG. 7
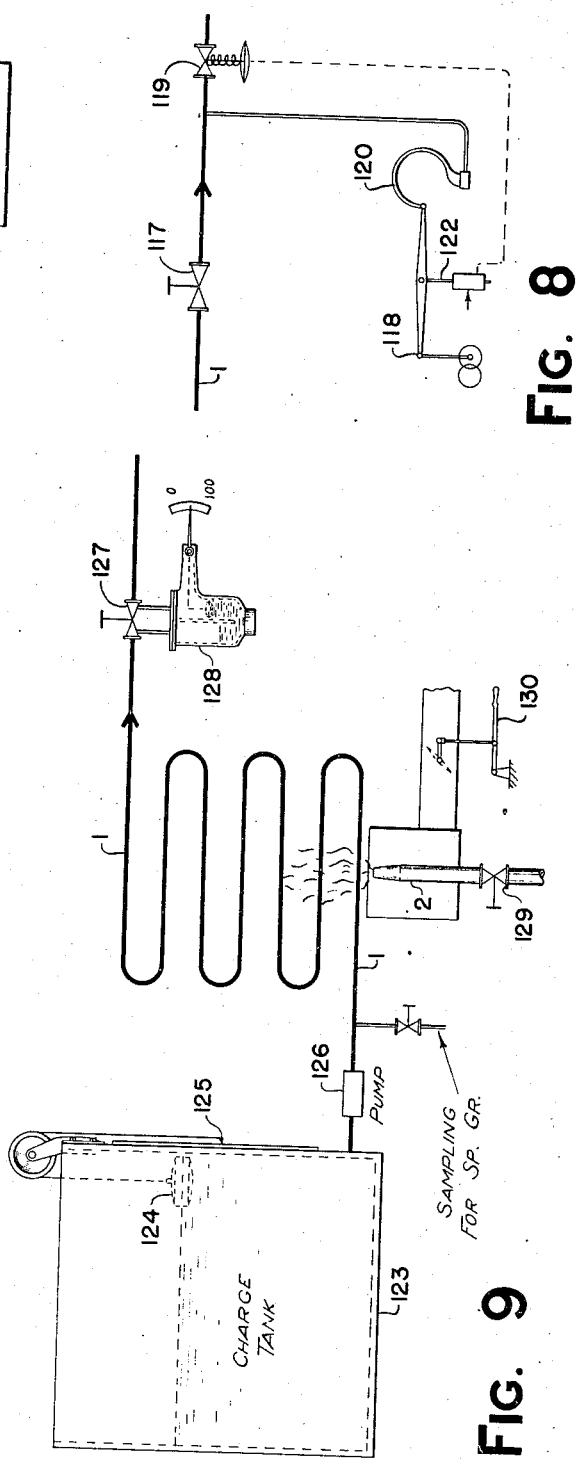
FIG. 8
FIG. 9
INVENTOR
Raymond W. Junkins
BY
ATTORNEY Oct. 8, 1940.   R. D. JUNKINS   2,217,637
CONTROL SYSTEM
Filed July 9, 1937   12 Sheets-Sheet 9
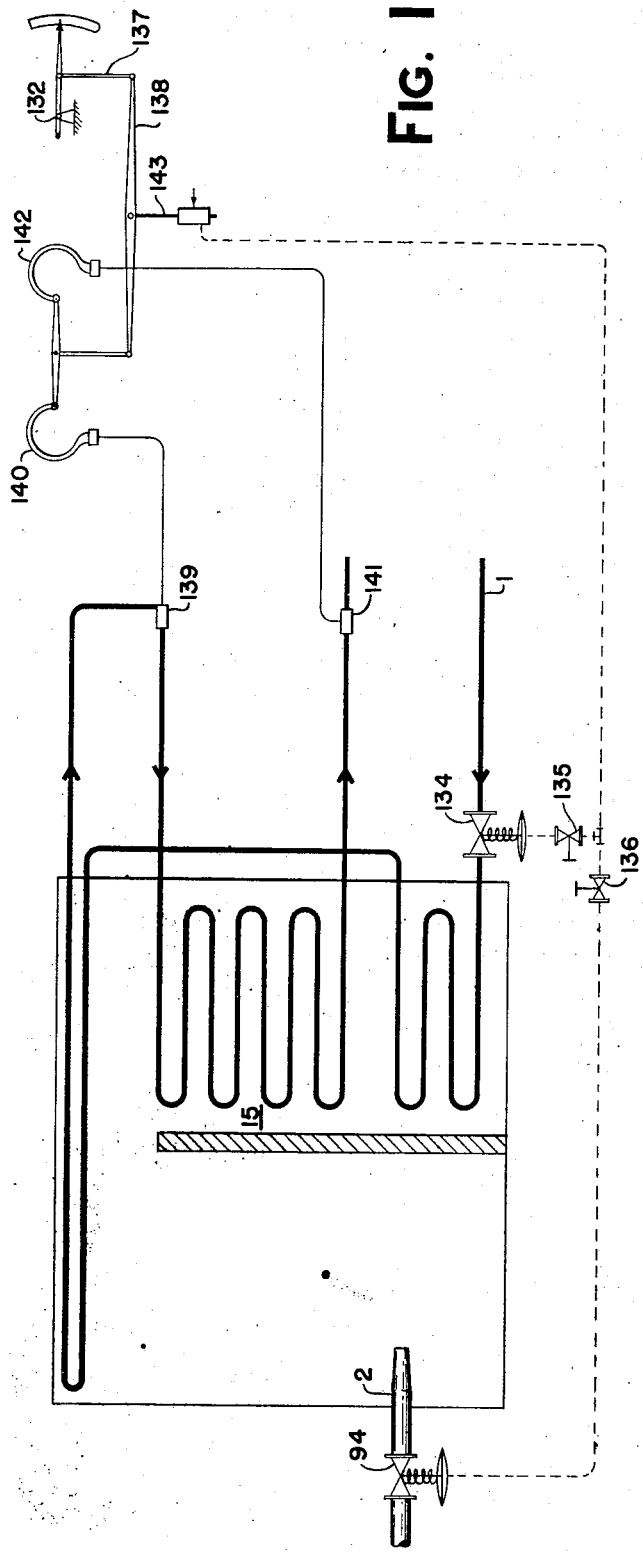
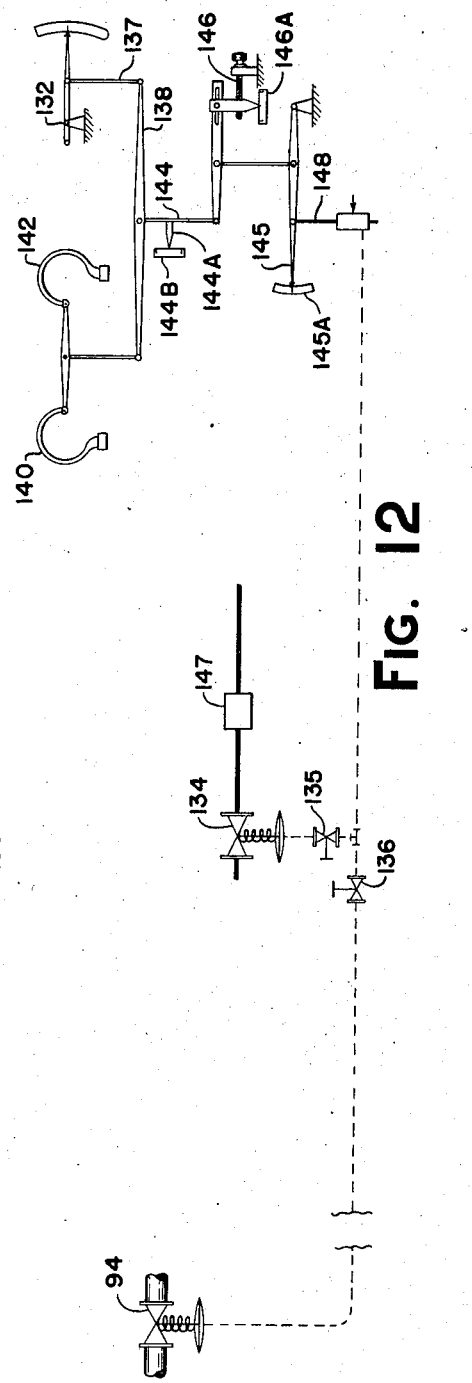
INVENTOR
Raymond D. Junkins
BY
ATTORNEY Oct. 8, 1940.     R. D. JUNKINS     2,217,637
CONTROL SYSTEM
Filed July 9, 1937     12 Sheets-Sheet 10

INVENTOR
Raymond D. Junkins
BY
ATTORNEY

Oct. 8, 1940.     R. D. JUNKINS     2,217,637
CONTROL SYSTEM
Filed July 9, 1937     12 Sheets-Sheet 11

INVENTOR
Raymond D. Junkins
BY
ATTORNEY

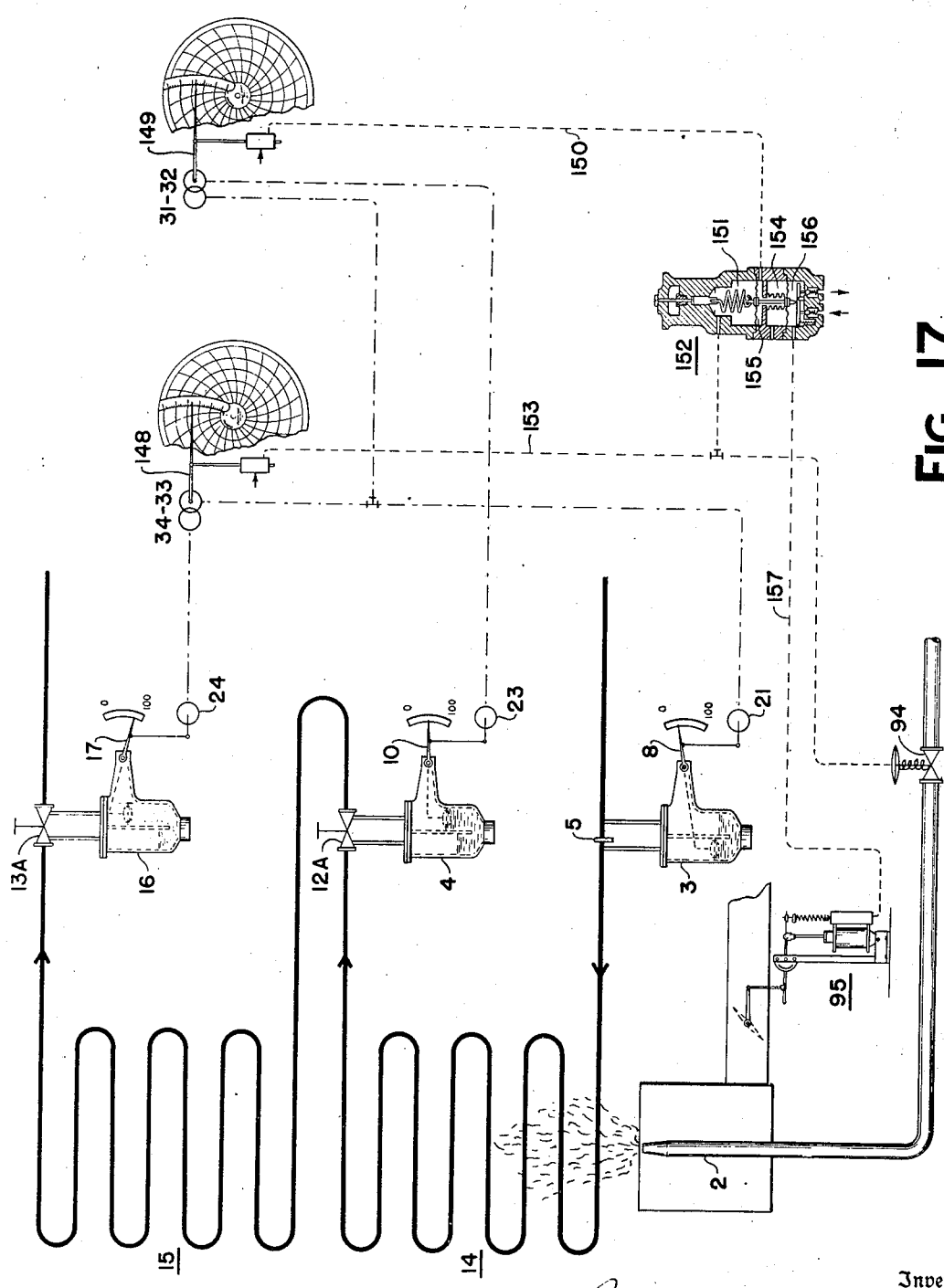

Patented Oct. 8, 1940

2,217,637

UNITED STATES PATENT OFFICE 2,217,637

CONTROL SYSTEM

Raymond D. Junkins, Cleveland Heights, Ohio, assignor to Bailey Meter Company, a corporation of Delaware Application July 9, 1937, Serial No. 152,858

27 Claims. (Cl. 122—448)

This invention relates to the art of measuring and/or controlling the magnitude of a variable quantity, condition, relation, etc., and particularly such a variable condition as the density of a liquid-vapor mixture, although the variable may be temperature, pressure, or any physical, chemical, electrical, hydraulic, thermal, or other characteristic.

My invention is particularly directed to a variable condition such as, for example, the density of a flowing fluid under treatment. The variation in the flowing fluid under treatment may be epitomized as a "condition" change and, for the purpose of this application, it will be understood that a condition change may be either a physical or chemical change, or both, and that the method hereinafter outlined and the apparatus specified is designed to be effective for all such conditions.

"Condition change" refers to a change in the character or quality or condition of a fluid as distinguished from a quantity change such as rate of flow, or change in a position as, for instance, movement of the fluid from one tank to another. Moreover, whenever herein the word "treating" or "treatment" is used, it is to be understood that any acting upon or in connection with a fluid is intended; a fluid is treated when it is heated, when it undergoes chemical change, when two or more varying-characteristic fluids are brought together, when a fluid is electrolized, or when its degree of ionization is changed, as for instance by dilution, change of temperature, etc., and in general, when anything is done in connection with a fluid which is qualitative as distinguished from quantitative.

These terms "qualitative" and "quantitative" have reference to the broadest meaning thereof when used in connection with a definition of what is meant by "condition change"; for instance, the addition to or subtraction of heat from a fluid may merely cause it to expand or contract in size per unit of weight, but this change is nevertheless considered as qualitative rather than quantitative. Similarly, passage of electrical current from one electrode to another immersed in a fluid is considered to effect a qualitative change therein within this disclosure; in short, any phenomena in a flowing fluid which so evidences itself as to be measured in the manner herein disclosed or in connection with a density determination is deemed to be a "condition change."

Having the foregoing in mind, it will be seen that condition changes may occur as the result of several different operations, sequentially or simultaneously. For instance, considering the change in density which occurs in a flowing fluid, such change may be the result of the heating of the fluid, or of an alteration in the chemical composition of the fluid without heat being imparted thereto, or of an expansion of the fluid while flowing through a treating zone, for instance by changing the volume per unit lineal distance of the space in which the fluid is traveling, or a combination of these effects may cause changes in the density of a flowing fluid with consequent production of a variable which may be used as a basis for fluid processing control. It should not, of course, be overlooked that similar differing conditions may also result in variations in temperature, pressure, and the other factors which vary in a process. Moreover, a temperature change may occur in a fluid entirely because of internal action and without any external subtraction or addition of heat, that is, as a result of chemical action.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure and rate of flow of the fluid stream being treated, yet a knowledge of the density of the flowing stream at different points in its path is of a considerably greater value to the operator, but was not available prior to the discovery by Robert L. Rude, as claimed in his co-pending application Serial No. 152,860, filed July 9, 1937.

In the treatment of water below the critical pressure, as in a vapor generator, a knowledge of pressure, temperature and rate of flow may be sufficient for proper control, inasmuch as definite tables have been established for interrelation between temperature and pressure, and from which tables the density of the liquid or vapor may be determined. However, there are no available tables for mixtures of liquid and vapor.

In the processing of a fluid, such as a petroleum hydrocarbon, a change in density of the fluid may occur through at least three causes:
1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the density of the fluid, or of a mixture of the liquid and vapor, that the operator may have any reliable knowledge as to the physical condition of the fluid stream at various points in its treatment, or when subject to a condition change.

It will be readily apparent to those skilled in the art that the continuous determination of the density of such a flowing stream is of tremendous importance and value to an operator in controlling the heating, mean density, time of detention and/or treatment in a given portion of the circuit, etc. A continuous knowledge of the density of such a heated flowing stream is particularly advantageous where wide changes in density occur due to formation, generation, and/or liberation of gases, with a resulting formation of liquid-vapor mixtures, velocity changes, and varying time of detention in different portions of the fluid path. In fact, for a fixed or given volume of path, a determination of the mean density in that portion provides the only possibility of accurately determining the time that the fluid in that portion of the path is subjected to heating or treatment. By my invention I provide the requisite system and apparatus wherein a determination of such information comprises the guiding means for automatic control of the process or treatment.

While illustrating and describing my invention as preferably adapted to the cracking of petroleum hydrocarbons, it is to be understood that it may be equally adaptable to the vaporization or treatment of other liquids and in other processes. For example, in the distillation of oils the generation of steam, and other chemical and/or physical processes, wherein a fluid is subjected to a condition change, as for example the heating of a fluid flow path. In particular, the invention relates to the automatic control of the treatment process, and as a specific example thereof I have illustrated and will describe the control of the rate of flow and of the heating in a cracking still.

In the drawings:

Fig. 1A is similar to Fig. 1 utilizing volumetric type flow meters.

Fig. 1B is a detail of Fig. 1A.

Figure 4:
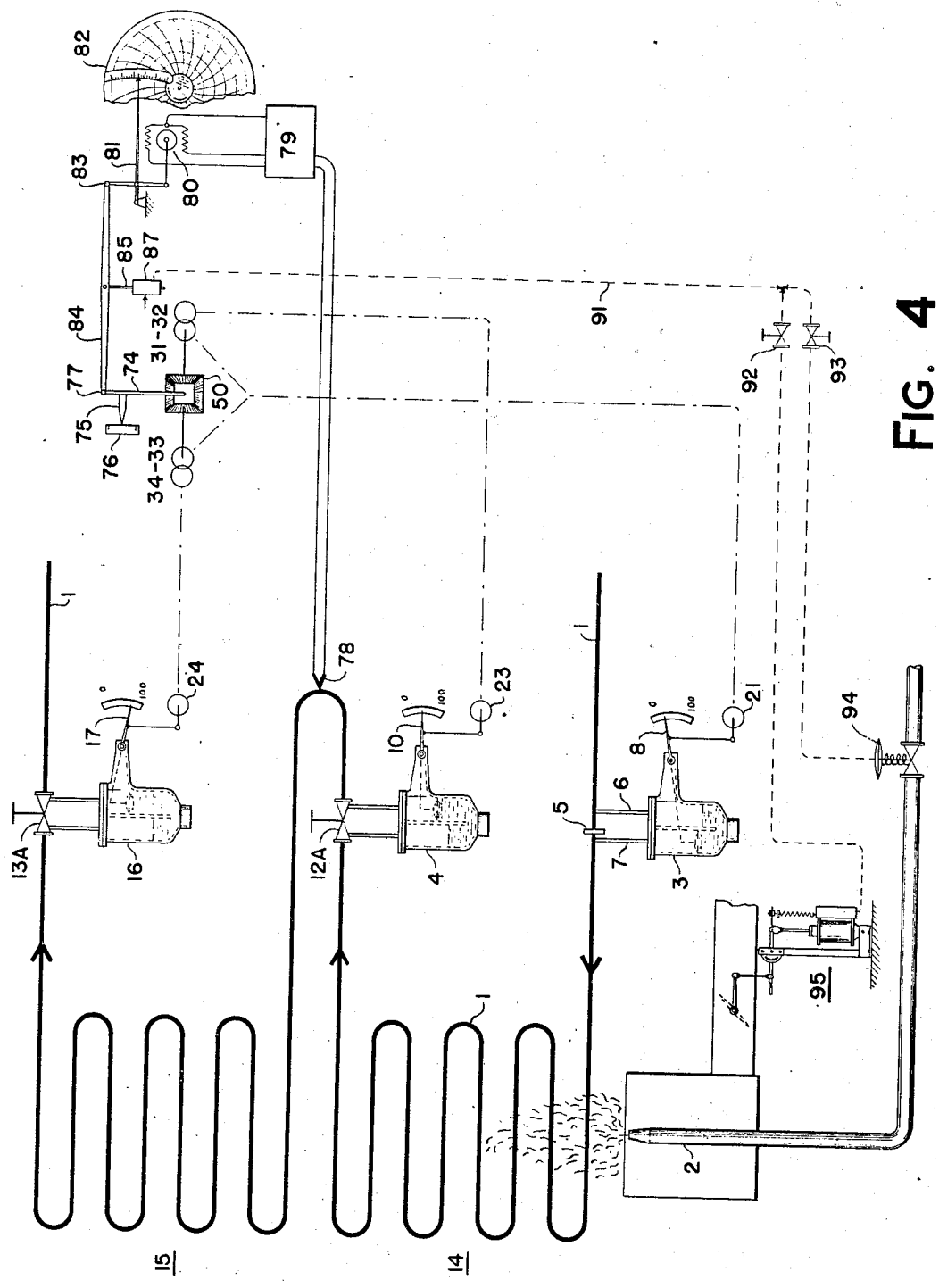

Fig. 4 diagrammatically illustrates a control of combustion from density and temperature.

Figure 5:
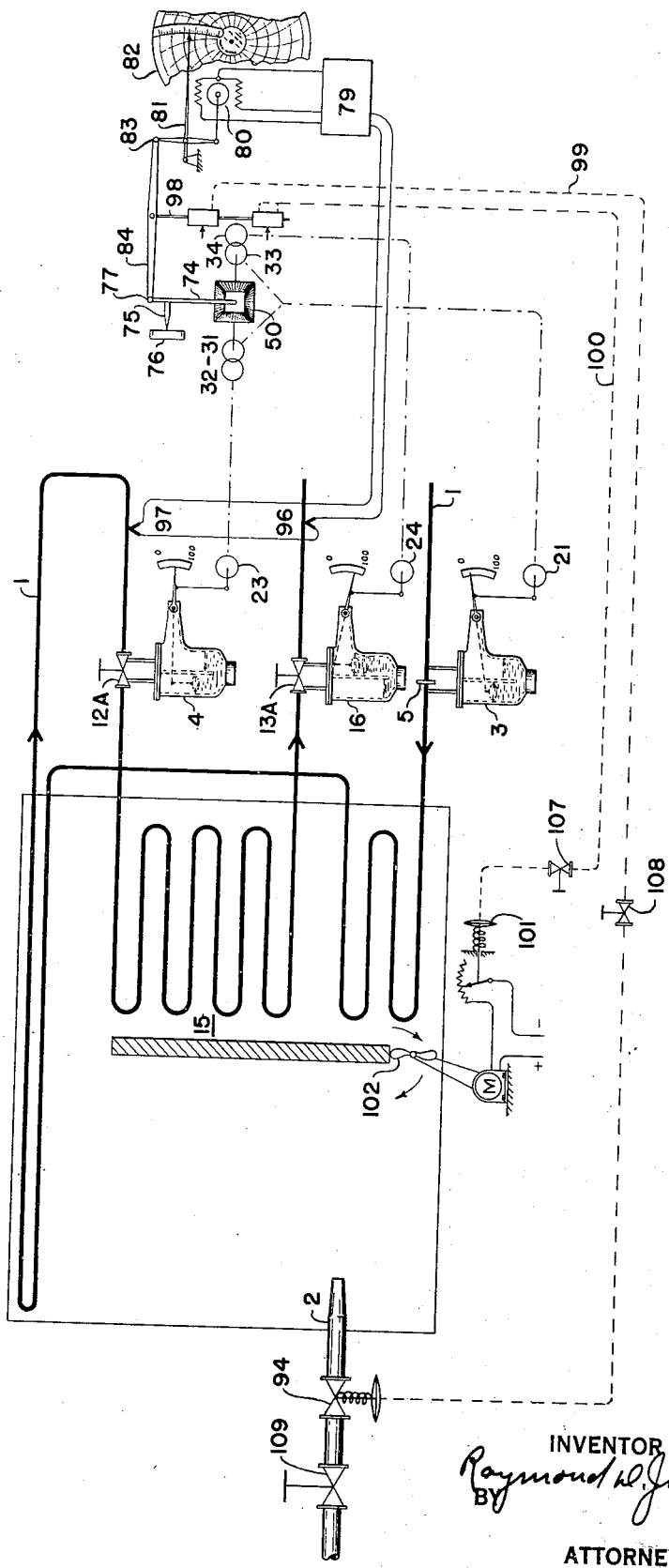

Fig. 5 diagrammatically illustrates another arrangement of combustion control.

Figure 6:
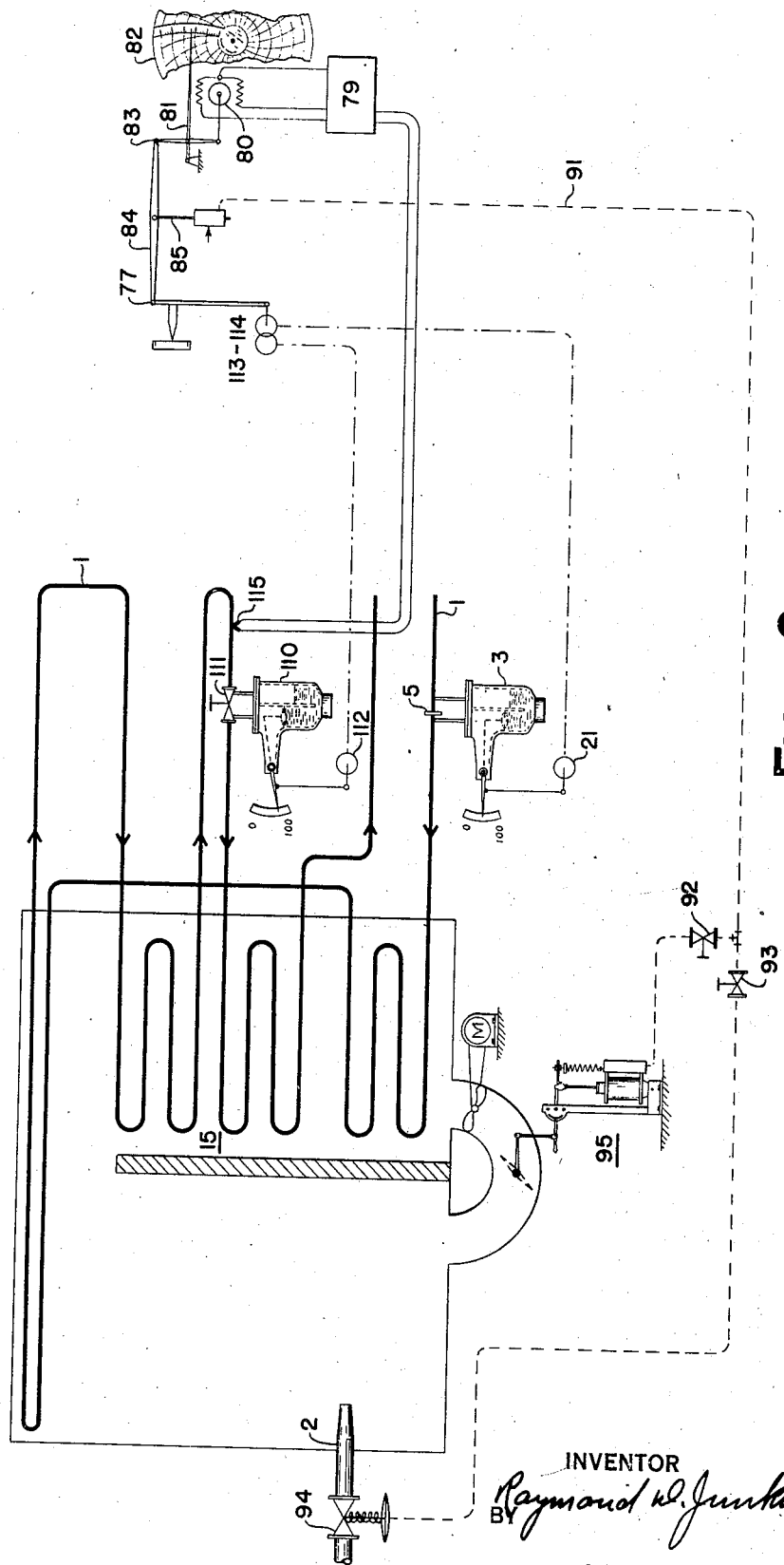

Fig. 6 diagrammatically illustrates a control of heating and recirculation of the products of combustion in connection with a cracking still.

Figs. 7 and 8 illustrate a control of the fluid flow in an oil refining process.

Fig. 9 illustrates apparatus for guiding the control of condition change in a heated fluid path.

Figure 10:
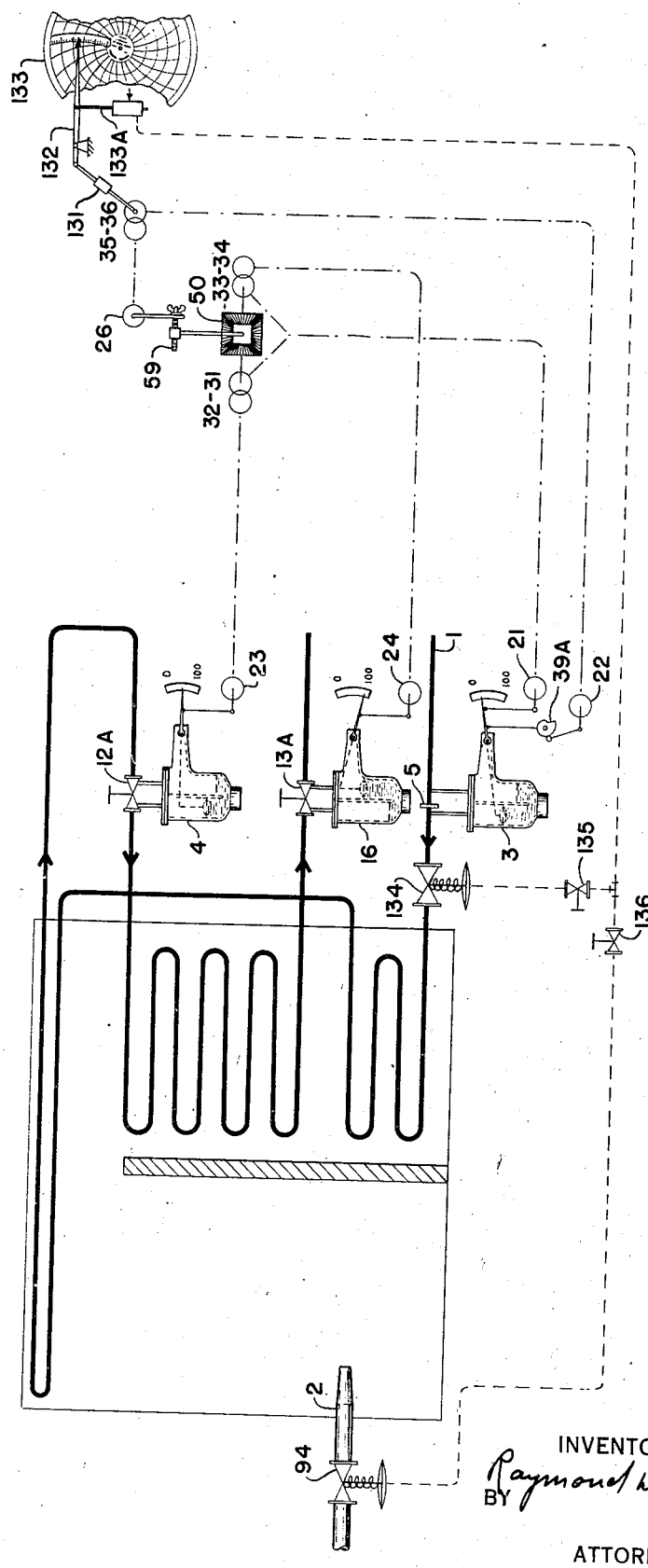

Fig. 10 is an arrangement for determining time of treatment and control therefrom.

Fig. 11 illustrates diagrammatically an arrangement supplemental to Fig. 10 for determining time-temperature relationship and control therefrom.

Fig. 12 is supplemental to Figs. 10 and 11 for determining yield per pass and control therefrom.

Figure 13:
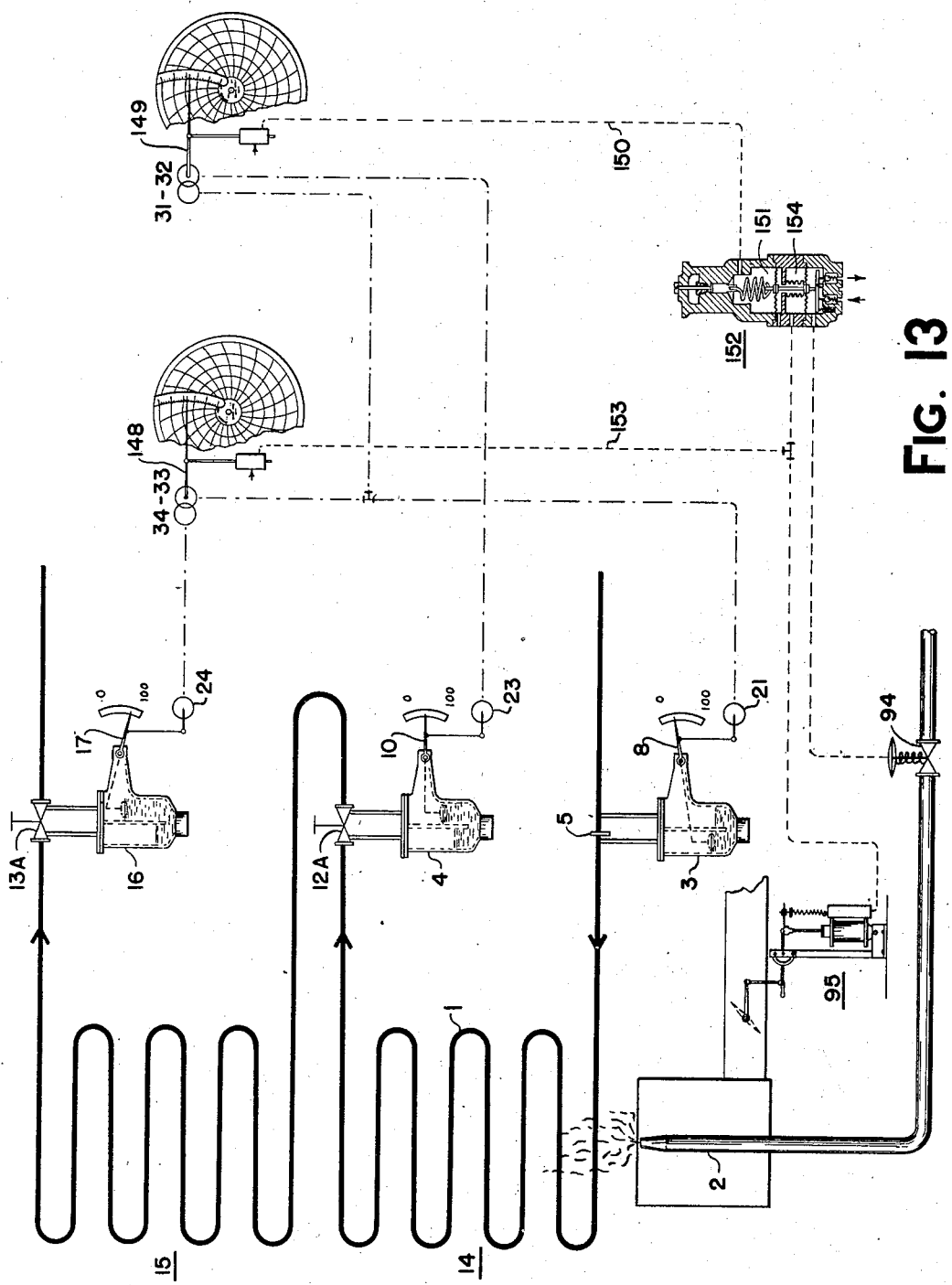

Fig. 13 diagrammatically illustrates a control of combustion from a condition value at a plurality of points in the flow path.

Figure 14:
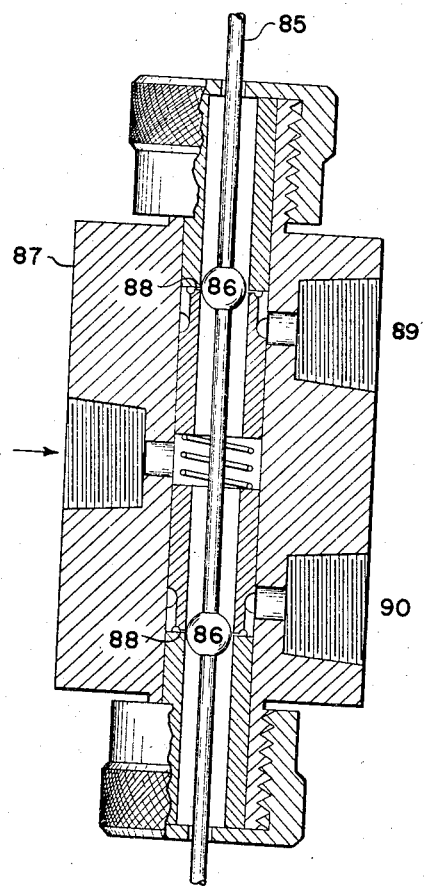

Fig. 14 is a sectional elevation in detail of a pilot valve assembly.

Figure 15:
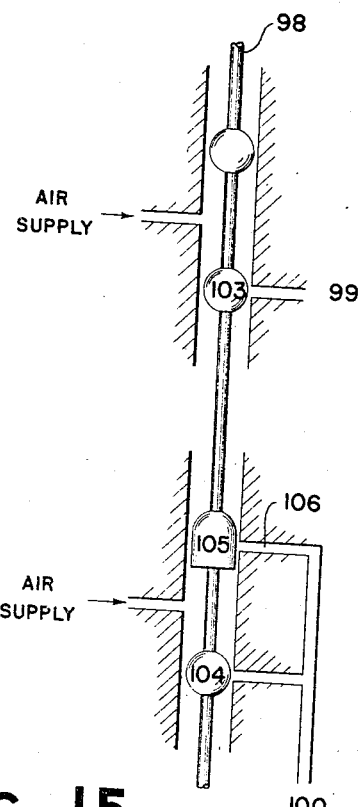

Fig. 15 is a diagrammatic view of a special pilot valve construction.

Figure 16:
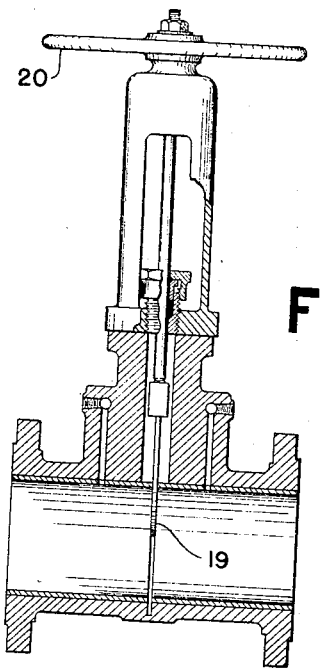

Fig. 16 is a sectional elevation of an adjustable orifice.

Fig. 17 diagrammatically illustrates a variation of the showing of Fig. 13.

Figure 1:
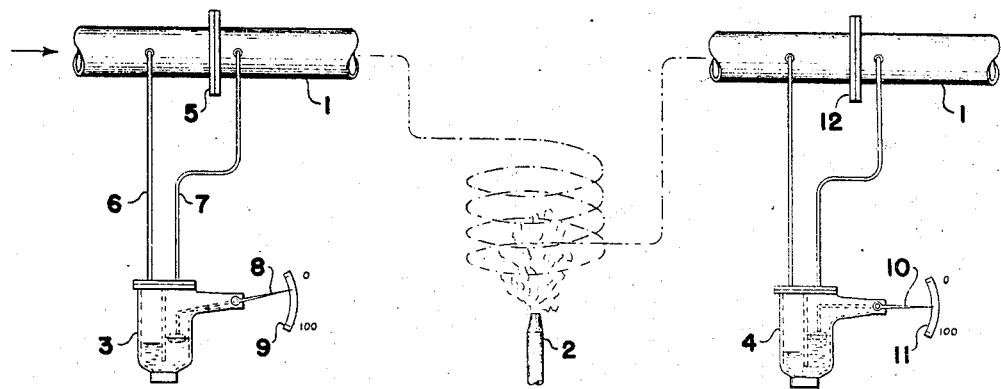
Fig. 1 is a diagrammatic representation of density measuring apparatus for a heated fluid stream.

Referring now in particular to Fig. 1, I indicate therein a conduit 1 which may be considered as comprising the once through fluid path of an oil still wherein a portion of the path is heated as by a burner 2. With such an arrangement the fluid will undergo a condition change and, during such condition change, the density of the fluid will change so that the density at the outlet of the section which is being heated will be different from the density at the inlet of that section. If the section in question is the conversion section in an oil cracking furnace, the condition change brought about by the application of heat may be a physical change, or a chemical change, or a combination of both. The rate of flow of the charge or relatively untreated hydrocarbon is continuously measured by the rate of flow meter, or differential responsive device 3, while a differential responsive device 4 is located with reference to the conduit 1 beyond the heating means or after the flowing fluid has been subjected to a condition change such as heating or other processing.

While the fluid flow measuring instrumentalities 3 and 4 are illustrated and described as differential pressure responsive devices, it will be understood that such showing and description are illustrative only and not to be taken in a limiting sense, because fluid flow measuring devices such as displacement meters, volumetric meters, Thomas meters, or the like, may be used in the determination of fluid density in practicing the invention herein disclosed.

The float-actuated meter 3 is sensitive to the differential pressure across an obstruction, such as an orifice, flow nozzle, Venturi tube, or the like, positioned in the conduit for effecting a temporary increase in the velocity of the flowing fluid. Such an orifice may be inserted in the conduit between flanges as at 5. The meter 3 is connected by pipes 6, 7 to opposite sides of the orifice 5 and comprises a liquid sealed U-tube, in one leg of which is a float operatively connected to position an indicator 8 relative to an index 9. In similar manner the indicator 10 of the meter 4 is positioned relative to an index 11; the meter 4 being responsive to the differential head across an orifice or similar restriction between the flanges 12.

The relation between volume flow rate and differential pressure (head) is:

$$Q = cM\sqrt{2gh} \qquad (1)$$

where
Q = cu. ft. per sec.
c = coefficient of discharge
M = meter constant (depends on pipe diameter and diameter of orifice hole)
g = acceleration of gravity = 32.17 ft. per sec. per sec.
h = differential head in ft. of the flowing fluid.

The coefficient of discharge remains substantially constant for any one ratio of orifice diameter to pipe diameter, regardless of the density or specific volume of the fluid being measured. With c, M and $$\sqrt{2g}$$

all remaining constant, then Q varies as the $$\sqrt{h}$$

Thus it will be seen that the float rise of the meters 3, 4 is independent of variations in density or specific volume of the fluid at the two points of measurement and that the reading on the indexes 9, 11 of differential head is directly indicative of volume flow. If the conduit size and orifice hole size are the same at both meter locations, then the relation of meter readings is indicative of the relation of density and specific volume; head varying directly with specific volume and inversely with density. Thus for the same weight rate of flow past the two metering locations the differential head at location 12 will increase with decrease in density of the fluid, and vice versa.

If it is desired to measure the flowing fluid in units of weight, Formula 1 becomes:

$$W = cM\sqrt{2ghd} \qquad (2)$$

where
W = rate of flow in pounds per sec.
d = density in pounds per cu. ft. of the flowing fluid.
h = differential head in inches of a standard liquid such as water.
M = meter constant now including a correction between the density d of the flowing fluid being measured and the density of the liquid in the manometer which is some standard such as water.

Assuming the same weight rate of flow passing successively through two similar spaced orifices 5, 12, and with a change in density as may be caused by the heating means 2, then the density at the second orifice 12 may be determined as follows:

$$W_{12} = W_5$$

$$\sqrt{2gh_{12}d_{12}} = \sqrt{2gh_5d_5}$$

$$\sqrt{h_{12}d_{12}} = \sqrt{h_5d_5}$$

$$d_{12} = d_5 \times \frac{h_5}{h_{12}} \qquad (3)$$

Thus it will be observed that, knowing the density of the fluid passing the orifice 5, we may readily determine the density of the fluid passing the orifice 12 from the relation of differential pressures indicated by the meters 3, 4.

As an example of other types of fluid flow measuring devices, I illustrate in Figs. 1A and 1B the use of displacement or volumetric type meters in an arrangement in general like that of Fig. 1.

In Fig. 1A the volumetric or displacement type of flow meter 3A is located in the conduit 1 ahead of the heating means 2, while a similar flow meter 4A is located after the flowing fluid has been subjected to heating or to other treatment.

As known, the total volume of fluid passing through a conduit in a given length of time is conveniently and accurately measured by positive displacement meters which have as a primary element a chamber or chambers through which the fluid passes in successive isolated quantities or volumes. These quantities may be separated from the stream and isolated by alternate filling and emptying of containers of known capacity and fluid cannot pass through without actuating the primary device. The secondary element of such a meter usually is a counter with suitably graduated dials for indicating the total quantity that has passed through the meter up to the time of reading. In Fig. 1A, however, the rotatable shaft which normally actuates such a counter is herein adapted to drive or position the mechanism which functions to determine density of the fluid.

The primary elements 3A and 4A which are inserted in the conduit 1 each have complementary rotatable members 158 which are mounted for rotation upon shaft centers in such a manner as to be in sealing contact with the inner wall of the meter casing and with each other. Thus, an effective seal is provided across the conduit 1 at device 3A and at device 4A. However, inasmuch as the elements 158 are rotatable, pressure of the fluid at the entrance to the device 3A causes rotation of the elements 158 therein, which causes the passage of definite trapped portions of fluid through the device 3A from the inlet to the outlet. The operation of the device 4A is similar.

The speed of a flexible shaft 159 leaving the primary element 3A varies directly with rate of fluid flow, directly with variations in specific volume of the fluid, and inversely with variations in density of the fluid. The same is true of the speed of a shaft 160 leaving the primary element 4A in regard to the fluid flowing therethrough.

By interrelating or comparing the speed of the shafts 159, 160 I may determine the relative density between the two locations, or for example compare the density of the fluid before the heating means 2 with its density at a location after the heating means. This comparison will allow me to ascertain the change in specific volume or density, due to the treatment or heating by the means 2, as well as to ascertain an indication of the heat change in the fluid.

While I have stated that the speed of the shaft 159 as well as the speed of the shaft 160 will individually vary with rate of flow of fluid, still if I am making a comparison of the speed of the shafts 159, 160 where the same fluid passes successively through the meters 3A, 4A, then variations in the rate of flow will have no more effect upon the one shaft speed than upon the other shaft speed, and may therefore be disregarded entirely. Thus the speed of the shafts, 159, 160 will vary with variations in specific volume or density at the individual meters 3A, 4A.

As previously stated for the example illustrated herein, I consider that the fluid entering the meter 3A is the charge or relatively untreated hydrocarbon to the furnace, and at a substantially uniform specific gravity or density. Such may be determined periodically if desired to ascertain whether it has in fact departed from the design conditions for which the meter 3A and shaft 159 are calibrated. Assuming then for the moment that the specific gravity or density of the fluid in the conduit 1 entering the meter 3A remains constant, then the density of the fluid passing through the meter 4A may be determined as follows:

$$d_{4A} = d_{3A}\frac{S_{159}}{S_{160}} \qquad (3A)$$

Where $d_{3A}$ = density of fluid passing through meter 3A
$d_{4A}$ = density of fluid passing through meter 4A
$S_{159}$ = speed of shaft 159 of meter 3A
$S_{160}$ = speed of shaft 160 of meter 4A This is, of course, predicated upon the fact that the meters 3A and 4A are of the same size and design so that if the same volume rate of fluid at the same density conditions is passing through the two, then the speeds of the shafts 159, 160 are the same.

As a practical means of mechanically solving the Formula 3A to determine the density of the fluid passing through the meter 4A, I will now describe in detail the showing of Figs. 1A and 1B.

A disk 161 is adapted to be rotated by the displacement meter 3A through the shaft 159. Frictionally engaging the disk 161 is a sphere or ball 162 likewise frictionally engaging a rotatable spool 163 supported by a carriage 164. The spool 163 is provided with an arm 165 as shown in Fig. 1B carrying a pair of contacts 166 and 167 connected through suitable slip rings in a drum 168 to opposed fields 169 and 170 respectively of a motor 171.

The drum 168 is rotated by the meter 4A through the agency of the shaft 160 and carries a contact 172 cooperating with the contacts 166, 167. The contact 172 is connected through a slip ring in the drum 168 directly to the power source 173 through a conductor 174. The arrangement is such that upon engagement of the contact 172 with the contact 166 the field 169 is energized and conversely upon engagement of the contact 172 with the contact 167 the field 170 is energized. The motor 171 is adapted to drive an indicating-recording pen arm 175 relative to a chart 176 through gears 177 and in unison therewith the carriage 164 through a gear 178 meshing with a suitable rack 179 carried in the carriage 164.

In operation, assuming the system to be in equilibrium the contacts 166, 167 will be rotated at synchronous speed with the contacts 172 so that the fields 169, 170 of the motor 171 are deenergized. Upon an increase in the rate of firing through the burner 2 with a corresponding increase in specific volume and conversely a decrease in density of the fluid passing through the meter 4A, the speed of the shaft 160 will increase relative to the speed of the shaft 159. Thus the rotative speed of the drum 168 and of the contact 172 will increase relative to the rotative speed of the disk 161, the spool 163 and the contacts 166, 167. The arrangement is such that the contact 172 will engage the contact 166, causing energization of the field 169 and rotation of the motor 171 in proper direction to move the carriage 164 to the right on the drawings, whereby the radius of contact of the sphere 162 with the disk 161 relative to the center of the disk 161 will be increased, and thereby the speed of rotation of the spool 163 and contacts 166, 167 will be increased relative to what it was previously, and such action will continue until the rotative speed of the contacts 166, 167 and the contact 172 is in synchronism and the contact 172 is not close circuited with either the contact 166 or the contact 167, whereafter rotation of the motor 171 will cease. The position of the carriage 164 and correspondingly (through the gear 177) of the indicator 175 relative to the chart 176 is indicative of the density of the fluid passing through the meter 4A. This may be seen from the following:

Angular travel of 165 = ∠ travel of 159 × Radius
Angular travel of 172 = ∠ travel of 160
But in equilibrium—
Angular travel of 165 = Angular travel of 172
Therefore—
∠ travel of 159 × Radius = ∠ travel of 160

$$R = \frac{\angle \text{travel of } 160}{\angle \text{travel of } 159}$$

and—
When ∠ travel of 159 = 0   R = infinity
When ∠ travel of 160 = 0   R = 0

Thus the radial distance from the center of the disk 161 to the point of contact of the sphere 162 with the disk 161, is a measure of the ratio of the speeds of the shafts 159, 160, and knowing the density of the fluid passing through the meter 3A, said radius is a measure of the density of the fluid passing through the meter 4A. The value of the density of the fluid passing through the meter 4A is indicated and recorded relative to the chart 176 by the positioning of the pointer 175 through the agency of the motor 171.

I have now illustrated and described two somewhat dissimilar types of flow metering devices utilized in the determination of density of a flowing fluid stream, but it does not seem necessary for an understanding of my invention to describe the utilization of more than a single representative type of metering device in the measuring and regulating of fluid treatment. I have, therefore, chosen the first example, namely, that illustrated in Fig. 1 as a representative type of fluid flow measuring apparatus, and which I will now describe in connection with the remaining drawings and the arrangements illustrated thereon. It is to be understood, however, that I could readily illustrate and describe the arrangement of Figs. 1A and 1B as adapted to the various arrangements of the subsequent sheets of drawings embodying my invention except that I feel that this would be an unnecessary duplication and lengthening of both the drawings and specification.

Figure 2:
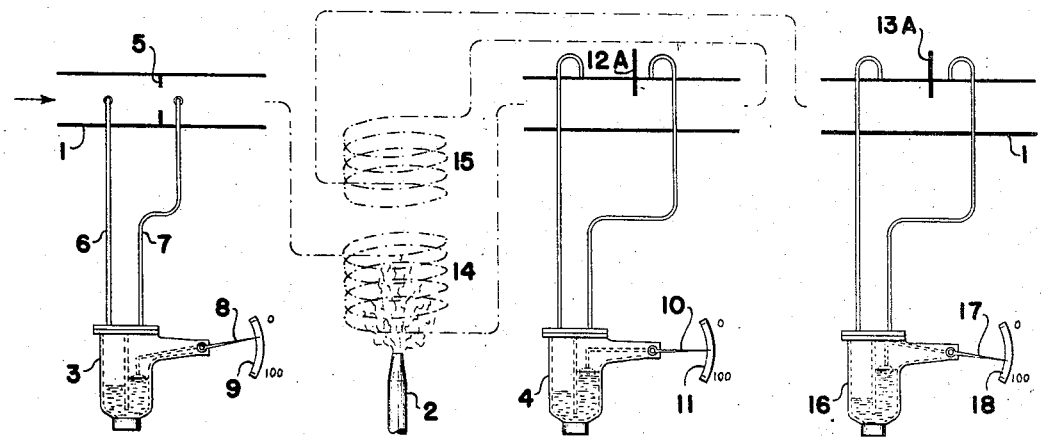
Fig. 2 is similar to Fig. 1 but includes a determination of mean density.

Referring now to Fig. 2, wherein like parts bear the same reference numerals as in Fig. 1, I indicate that after the fluid has passed through the orifice 12A it is returned to a further heating section of the still, from which it passes through a third differential pressure producing orifice 13A. The heating coil 14 will be hereinafter referred to as a first heating section, while the coil 15 will be referred to as a second heating section. In the preferred arrangement and operation of the still the section 15 is the conversion or cracking section, and the one in which it is primarily desirable to continuously determine the mean density of the fluid, as well as the time of detention or treatment in the section. For that reason I now desirably determine the mean density of the fluid in the section 15 and accomplish this through an interrelation of the differential pressures produced by the same weight flow passing successively through the orifices 5, 12A, 13A.

The same total weight of fluid must pass through the three orifices in succession so long as there is no addition to or diversion from the path intermediate the orifice locations. It is equally apparent that in the heating of a petroleum hydrocarbon, as by the coil 14 between the orifices 5 and 12A, there will be a change in density of the fluid between the two orifices, and furthermore that an additional heating of the fluid, as by the coil 15, will further vary the density of the fluid as at the orifice 13A relative to the orifice 12A.

Assume now that the conduit 1 is of a uniform size throughout and that the orifices 5, 12A and 13A are of a uniform opening area and coefficient or characteristic. Through the agency of the meter 16 the differential pressure existing across the orifice 13A is continuously indicated upon an index 18 by an indicator 17. The mean density of the fluid in the conversion section 15 is then obtained by averaging the density of the fluid at the orifices 12A, 13A. As for example:

$$md_{15} = \frac{d_{12A} + d_{13A}}{2} \qquad (4)$$

The density of the flowing fluid at the orifice 13A may be obtained in the same manner, relative to the density of the fluid at the orifice 5, as was previously determined (3) for the density of the flowing fluid at the orifice 12A. Simplifying this into a single operation I have:

$$md_{15} = \frac{d_5 \times \frac{h_5}{h_{12A}} + d_5 \times \frac{h_5}{h_{13A}}}{2}$$

$$= d_5 \frac{\frac{h_5}{h_{12A}} + \frac{h_5}{h_{13A}}}{2} \qquad (5)$$

Thus the mean density of the flowing fluid in the conversion section 15 (knowing the density or specific gravity of the fluid entering the system) may be directly computed from the readings of the indexes 9, 11, 18. This, of course, on the basis that the orifices 5, 12A, 13A are the same, and that the capacity of the float meters 3, 4, 16 is the same.

Now as the specific volume of a flowing fluid increases progressively from locations 5 to 12A to 13A, the differential pressure across these orifices increases in like manner, and in the operation of such a cracking still it may be that the differential pressure across an orifice 13A will be several times that across the orifice 5 if the orifice sizes are equal. I have, therefore, indicated at 12A, 13A of Fig. 2 that these orifices may be of an adjustable type wherein the ratio of orifice hole to pipe area may be readily varied externally of the conduit through suitable handwheel or other means. Reference may be had to Fig. 16, which shows a sectional elevational of a typical adjustable orifice having a segmental shaped plate 19 projecting across the internal area of the conduit 1 in varying degree depending upon the positioning of the plate 19 through the agency of a handwheel 20.

Such an adjustable orifice per se forms no part of my present invention, and inasmuch as it is an article of commerce readily obtainable in the open market, it is not believed necessary to go into greater detail in regard to its construction and operation.

The actual orifice design in terms of pounds per hour is:

$$W = 360 cfD^2 \sqrt{\frac{\max h}{\text{sp. vol.}}} \qquad (6)$$

where
  $W$ = lbs. per hr.
  $D$ = diameter of equivalent circular orifice hole in inches
  $c$ = coefficient of discharge
  $f$ = factor of approach
sp. vol. = cu. ft./lb.

Now considering that orifice 12A is so adjusted that its $cfD^2$ is different from that of orifice 5, we may then determine the density at 12A as follows:

$$d_{12A} = CR^2$$

where $$C = d_5 \left( \frac{cfD_5^2}{cfD_{12A}^2} \right)^2$$

$$R = \frac{\sqrt{h_5}}{\sqrt{h_{12A}}}$$

$$d_{12A} = d_5 \left( \frac{cfD_5^2}{cfD_{12A}^2} \right)^2 \times \left( \frac{\sqrt{h_5}}{\sqrt{h_{12A}}} \right)^2 \qquad (7)$$

In similar manner I may determine the density at the orifice 13A regardless of the orifice area, so long as I take into account the $cfD^2$ of the orifice in the above manner. It will thus be seen that, if the specific volume of the flowing fluid increases so rapidly that the differential head at successive orifice locations (for the same design of orifice) becomes many times the value of the differential head at the initial orifice, it would be impractical to attempt to indicate or record such differential heads relative to a single index or record chart without one or more of the indications or records going beyond the capacity of the index or chart. There are two ready means of overcoming this practical difficulty, the first being an adjustment of the successive orifices, such as 12A, 13A, to have new values of $cfD^2$ such that the indicator or recording pen will be kept on the chart; and the second through varying the basic capacity of the meter 4 or 16 relative to the meter 3. This latter method, comprising so arranging the meter 4, for example, that it requires 50% greater differential pressure to move the related pointer over full index range than in the case of meter 3. This may readily be accomplished by properly proportioning the two legs of the mercury U-tube, on one of which the float is carried. Of course it will be necessary to take such changes in capacity into account when utilizing the differential head readings in determining density or mean density.

For example, the reading of the pointer relative to the index should be on a percentage basis of whatever maximum head the meter is designed for. Then the total head corresponding to the indicator reading will be available or the proper correction may be applied. Assume that the meter U-tube 3 is so shaped that it requires 120" water differential applied thereto to move the indicator 8 from 0 to 100% travel over the index 9, and that for meters 4 and 16 it requires 250 inch water differential to cause the indicator 10 to move from 0 to 100% over the index 11, and 17 relative to 18. Then:

$F_3$ = % float travel of meter 3
  $F_4$ = % float travel of meter 4

$$\frac{h_5}{h_{12}} = .48 \frac{F_3}{F_4}$$

substituting in (7)

$$d_{12A} = d_5 \left( \frac{cfD_5^2}{cfD_{12A}^2} \right)^2 .48 \frac{F_3}{F_4} \qquad (8)$$

and $$md_{15} = \frac{.48d_5}{2}\left[\left(\frac{cfD_5^2}{cfD_{12A}^2}\right)^2\frac{F_5}{F_4} + \left(\frac{cfD_5^2}{cfD_{13A}^2}\right)^2\frac{F_5}{F_{16}}\right] \quad (9)$$

Figure 3:
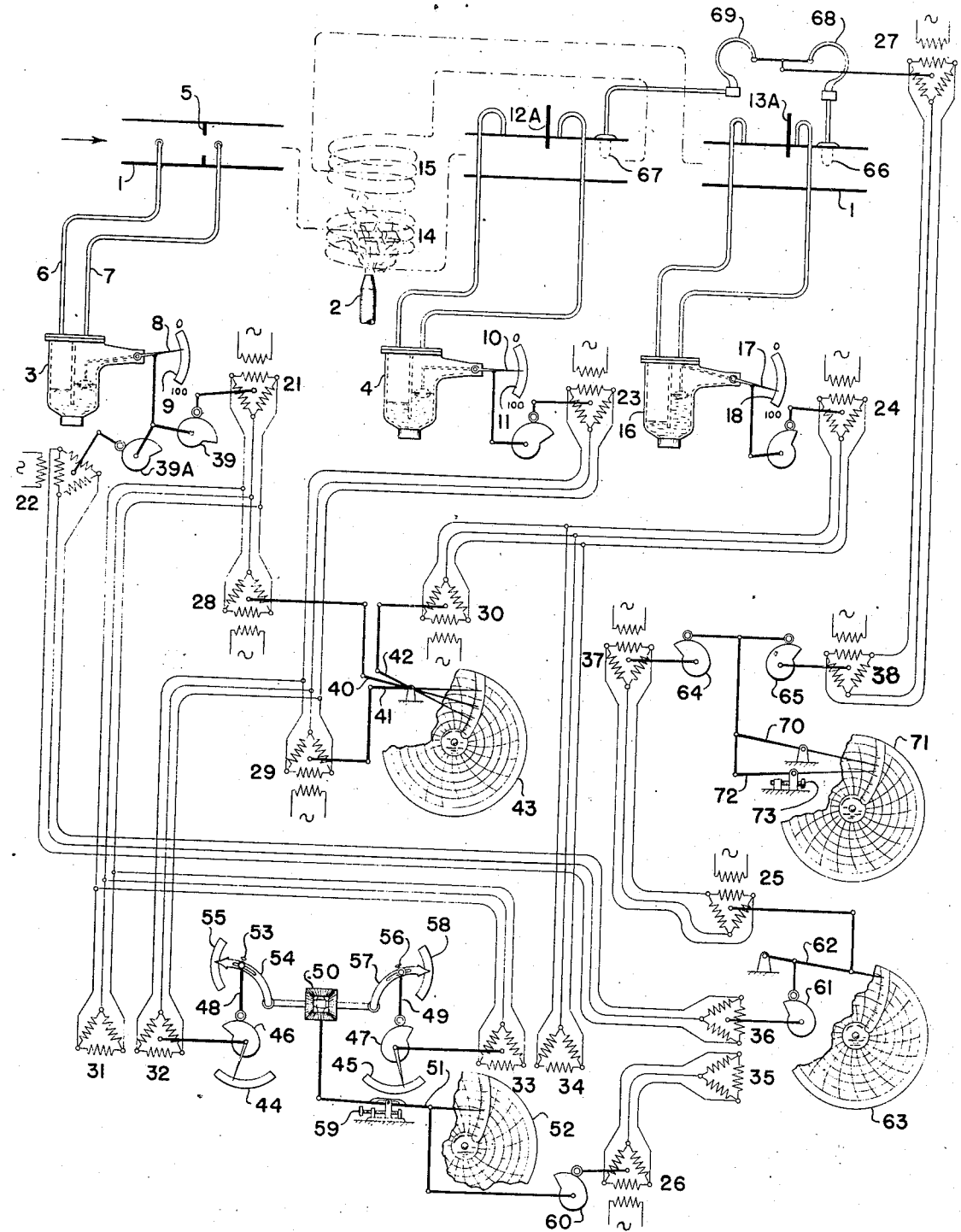
Fig. 3 is a diagrammatic arrangement of the measuring means in connection with a heated fluid stream.

In Fig. 3 I show in diagrammatic fashion the actual mechanism which I preferably employ to obtain indications of mean density, time of detention, etc. valuable as a guide to operation of the system and to actuate automatic control. According to Formula 5 it is necessary in determining the mean density of the conversion section to obtain the ratio of the differential heads at orifices 5 and 12A. Then to obtain the ratio of the differential heads at orifices 5 and 13A. To then average these ratios. I accomplish this result through the use of logarithms, a process well known in mathematics, whereby it is possible to obtain a quotient by subtraction or a product by addition. In connection with logarithmically designed cams I employ self-synchronous motors which lend themselves readily to addition or subtraction through differential windings, as well as having the feature of ready grouping at remote locations.

I indicate such self-synchronous generators for transmission of position at 21, 22, 23, 24, 25, 26 and 27, while the self-synchronous receiving motors are indicated at 28, 29, 30, 31—32, 33—34, 35—36, 37 and 38. The transmitting generator in each case is operated at a suitable angular rotation through the angular positioning of the rotor or single phase field winding. The stator or armature is in each case provided with a 3-phase winding. The field windings of each transmitting generator are energized from a suitable source of alternating current supply.

The operation of systems of this general character for the transmission of angular movement is well known in the art. Voltages are induced in the 3-phase stator windings of the transmitter or receiver by the single phase field winding on the associated rotor. When the rotor of one of the transmitters is moved from a predetermind position with respect to its stator, a change is effected in induced voltage in the armature winding and the rotor of the receiving motor assumes a position of equilibrium relative to the transmitting generator, wherein the induced voltages in the 3-phase windings are equal and opposite, and consequently no current is set up in the armature winding. If the rotor of one of the generators is turned and held in a new position the voltage is no longer counterbalanced, whereby equalizing currents are caused to flow in the armature windings which exert a torque on the rotor of the receiving motor, causing it to take up a position corresponding to the position of the transmitting generator.

The receiving motors 28, 29, 30 are individually positioned in synchronism with the transmitting generators 21, 23, 24. Between the indicator arm 8 and the transmitting generator 21 I interpose a cam 39 having a rise proportional to the logarithm of its angular motion, to the end that the receiving motor 28 and the recording indicator 40 positioned thereby assume a position corresponding to log $h_5$. Similarly the indicator arm 41 is positioned by the receiving motor 29 in accordance with the value of log $h_{12A}$, while the indicator 42 is positioned in accordance with the value of log $h_{13A}$.

Actually the design is such that the transmitting generator 21 (positioned in accordance with log $F_5$) attains maximum desired rotation with from 10–100% full float travel. No motion of the generator 21 occurs when the float of the meter 3 moves over 0–10% of its travel range. This because it is impossible to have a logarithmic cam start at zero, as the number 0 has no logarithm. Also because the logarithmic characteristics are such that I would have as much cam rise for from 1% to 10% of float rise as from 10% to 100%. Thus I may make the cam 39, and the similar cams of the meters 4 and 16, of practical size and proportion by sacrificing only the first 10% of the float travel of the meters and with the expectation that the operation will not normally be below 10% of full float travel.

In addition to indicating and recording in interrelation upon the record chart 43 the values of the log of the differential pressures at the three orifices, the position of the transmitting generators 21, 23, 24 is utilized through the agency of differential self-synchronous devices to algebraically add the value of the log $h$ for the different orifices and thus accomplish the ratio operation. Angular movement imparted mechanically to the rotors of the transmitting generators 21, 23 will result in an angular positioning of the rotor of the receiving motor 31—32. Similar action occurs between the transmitting generators 21, 24 and the receiving motor 33—34; and between the transmitting generators 22, 26 and the receiving motor 35—36.

The receiving motors 31—32, 33—34, and 35—36 have 3-phase rotor windings and 3-phase stator windings and are commonly known as differential self-synchronous motors, for in each case they are responsive to two of the transmitting generators and assume a rotor position corresponding in differential effect from the two related transmitters. For example, the receiving motor 31—32 has its rotor positioned responsive to a differential between the position of the rotor 21 and that of the rotor 23, or according to log $h_5 - \log h_{12A}$, thus performing the mathematical operation:

$$\log\frac{h_5}{h_{12A}} = \log h_5 - \log h_{12A}$$

Correspondingly the receiving motor 33—34 has its rotor positioned responsive to a differential between the position of the rotor 21 and that of the rotor 24, thus performing the mathematical operation:

$$\log\frac{h_5}{h_{13A}} = \log h_5 - \log h_{13A}$$

From Formula 5 the mean density of the fluid in the conversion section is the density of the fluid at orifice 5 multiplied by the average of the ratio of heads for the different orifice locations 12A and 13A. In designing the apparatus I incorporate an average expected value of specific gravity or density of the fluid at the orifice 5 in the transmitted motion of the rotor of 31—32 and of the rotor 33—34. Thus, if the expected density exists at the orifice 5, the indicator moved by the rotor of 31—32 will indicate relative to the index 44 the instantaneous value of log $d_{12A}$, while on the index 45 may be read the instantaneous value of log $d_{13A}$.

The rotor of 31—32 angularly moves a cam 46 having a rise proportional to the antilog of its angular motion; likewise the rotor of 33—34 angularly moves an antilog cam 47. Thus the vertical movement of a roller at the lower end of a link 48, riding on the cam 46, is proportional to $d_{12A}$ and that of 49 to $d_{13A}$.

To obtain the means density through the conversion section 15 it becomes necessary to solve Formula 4, and this I accomplish through a differential mechanism 50 adapted to position an indicator 51 relative to an index and recording chart 52 to continuously record thereon the value of $md_{15}$.

It is to be understood that if the basic capacity of meters 3, 4, 16 vary one from the other, then as previously brought out, this may be taken care of as in (8). The linkage through which the arm 10 positions 23 and the linkage through which the arm 17 positions 24 may incorporate the necessary correction values. Or it might be taken into account as at (9) at the outlet side of antilog cams 46, 47. Furthermore, I have illustrated and described the orifices 12A and 13A as being adjustable as to $cfD^2$ value and (9) such may be taken into account at the same time.

Referring to Fig. 3, I provide at 53—54 means for manually adjusting the effect of angular positioning of cam 46 upon one-half of differential 50. Thus cam 46 which is angularly moved proportional to $$\log \frac{F_2}{F_4} \text{ or } \log \frac{h_5}{h_{12A}}$$

will position the arm 54 relative to the index 55 according to:

$$d_5 \left( \frac{cfD_5^2}{cfD_{12A}^2} \right)^2 \frac{h_5}{h_{12A}} \text{ or } d_{12A}$$

Likewise on index 58 may be indicated $d_{13A}$. The differential 50 then positions the arm 51 according to $$\frac{d_{12A}+d_{13A}}{2} \text{ or } md_{15}$$

At 59 I indicate a manual adjustment of the motion of arm 51 to take into account deviations in value of $d_5$ of (9) from design conditions, as might be attributed to changes in specific gravity, temperature, etc.

The arm 51 is adapted to position a logarithmic cam 60 for moving a transmitter 26 proportional to $\log md_{15}$. The meter 3 positions a cam 39A for moving a transmitter 22 proportional to $$\log \sqrt{h_5}$$

which so long as $d_5$ remains constant equals $\log W$ where W is rate of flow in pounds. The differential motor 35—36 is then under the influence of the transmitters 22, 26 representative of $\log W$ and $\log md_{15}$ and the resulting angular motion of cam 61 is:

$$\log T = \log md_{15} - \log W$$

Cam 61 is of antilog design and the arm 62 is moved relative to record chart 63 to indicate the time of detention or treatment of any particle of fluid in the heating section 15, from:

$$T = \frac{V md_{15}}{W}$$

where

T=Time any particle is in section 15.
V=Volume between 12A and 13A (cu. ft.)
$md_{15}$=Mean density (lbs. per cu. ft.)
W=Rate of flow (lbs. per unit T)

The position of the arm 62 is used to angularly position a transmitter 25, in turn positioning a receiver 37 and cam 64. Closely related is a cam 65 positioned by a receiver 38 under the control of a transmitter 27 responsive to mean temperature of the fluid mixture. Temperature responsive bulb 66 is located in the fluid at the outlet of the heating section 15, while bulb 67 is located at the inlet to the section. The corresponding Bourdon tubes 68, 69 are arranged to position the transmitter 27 according to the mean temperature of the fluid through the section 15. The cams 64, 65 may be designed as uniform rise cams or to take care of any characteristics or relationship as may be desired. Through their interrelation an indicator 70 is continuously positioned relative to an index and recording chart 71 to advise the time-temperature relationship for the conversion section 15.

An indicator pen 72 is positioned with the indicator 70 by the time-temperature relation but is further provided wtih a stock factor adjustment 73 so that the pen 72 records on the chart 71 the yield per pass. The stock factor adjustment 73 is available to correct for deviations in specific gravity, Anilin number, and such other variables as may affect the charge of fluid entering the conduit 1.

In Figs. 4, 5, 6, 7, 8, 10 and 13 I indicate the various self-synchronous transmitters and receivers of Fig. 3 as circles and the numerous interconnecting wires merely by dot-dash lines for the sake of simplicity on the drawings. In Figs. 4, 5, 6, 7, 8, 10, 11, 12 and 13 I indicate pipes transmitting loading air pressures by short dash lines to avoid confusion.

Referring now in particular to Fig. 4, I show therein the conduit 1 as a once through fluid heated path wherein the charge stock passes through the orifice 5 at the entrance to the still, then through the adjustable orifice 12A at the entrance to the conversion section, and then through the adjustable orifice 13A at the exit of the conversion section of the still. The general arrangement, similar to Fig. 3, is adapted (on the drawings) to vertically position the member 74, the pointer 75 relative to the index 76, and the pivot 77, in accordance with the value of mean density $md_{15}$ through the conversion section 15.

A thermocouple 78 is so located as to be sensitive to the temperature of the flowing fluid at the entrance to the conversion section 15 and actuates a potentiometer instrument 79 for energizing a motor 80 in one direction or the other. The motor 80 is arranged to position an indicator pen 81 to indicate and record on a record chart 82 the value of temperature at the location 78, and at the same time to vertically position a pivot point 83.

The pivot points 77, 83 form the two ends of a floating beam 84. Intermediate the ends of the beam 84 is freely suspended a pilot stem 85 for controlling an air loading pressure in accordance with relation between mean density and temperature.

Referring now to Fig. 14, it will be observed that the pilot stem 85 carries two spaced lands 86 and is axially movable relative to a passage through a housing 87. Air under pressure is available at the interior of the passage between the lands from any convenient source, such as an air compressor. Throughout the drawings I indicate the available air supply by a small arrow at the side of the pilot valve housings.

The lands 86 are in spaced relation to annular ports 88, the uppermost of which is in communication with an outlet connection 89 and the lowermost in communication with an outlet connection 90. The arrangement is in general such that axial movement of the stem 85 produces a gradation in pressure available at the connections 89, 90. For example, if the stem 85 is moved upwardly, then the air pressure available at the outlet connection 89 increases proportionally to the axial movement, while that available at the connection 90 decreases at the same time. Downward movement of the stem 85 causes a decrease in pressure at 89 and an increase in pressure at 90. Thus the air loading pressure available through the outlet connections 89, 90 is definitely related in direction and amount to the axial positioning of the stem 85. Such a pilot valve arrangement is more fully described and is claimed in the patent to Johnson, No. 2,054,464.

Referring to Fig. 4, the mean density through the conversion section 15 may vary not only through change in temperature, but through change in pressure, rate of charge, etc. Desiring to maintain a constant yield per pass, then if mean density varies due, for example, to change in pressure or change in rate of charge, I establish a new temperature standard whose effect is to return mean density and yield per pass to desired value and then I so control the firing as to maintain this new temperature standard.

By way of example, if through pressure or rate of charge the mean density through the conversion section varies, then the pivot point 77 is moved upwardly. This positions the pilot stem 85 and causes a corresponding variation in air loading pressure to vary the rate of firing; the air loading pressure from the pilot assembly 87 being effective through a pipe 91 and valves 92, 93 upon the fuel control valve 94 and/or the air control mechanism 95.

Through the agency of the valves 92, 93 the air loading pressure from the pilot valve 87 may be effective upon either the air supply or the fuel supply, or both. When through variation in the rate of firing the temperature at the thermocouple location 78 is varied in proper direction and amount, the new temperature effective in positioning the motor 80 moves the pivot 83 downwardly until the pilot 85 is returned to its equilibrium position. Thereafter slight variations in temperature, or in mean density, will position the pilot 85 to vary the firing in amount and direction whereby the desired temperature standard for a given value of mean density is maintained.

It is, of course, understood that after the new temperature standard for the new mean density has been attained this change in temperature will result in a change in mean density to return the mean density to its original desired value, and the new temperature necessary to maintain the mean density at that value will be recorded upon the chart 82.

Assume that I desire to maintain mean density and yield per pass constant. Then assume that an increase in pressure causes an increase in mean density and, for example, the pivot 77 moves downwardly. This positions the pilot 85 downwardly, increasing the loading pressure in the line 91 and increasing the rate of supply of the elements of combustion, or the firing. The increase in firing tends to raise the temperature at the location 78 and this results in a raising of the pivot point 83 with corresponding greater value recorded on the chart 82. The raising of the pivot point 83 tends to restore the pilot 85 to its original position. At the same time, however, the increase in firing decreases the mean density toward its original value and this causes a raising of the pilot 85 to somewhat decrease the firing. The system settles out to a state of equilibrium wherein substantially the predetermined mean density is maintained, but with a new temperature standard and the firing rate adjusted to maintain that temperature standard. Such a temperature standard corrects the mean density for the variation it felt from the other cause or causes of mean density change, such as pressure variation or variation in the rate of charge, etc.

At all times the indicator 75 will indicate relative to the index 76 the value of mean density through the conversion section, while the indicator 81 records and indicates relative to the chart 82 the value of temperature at the thermocouple location 78.

Fig. 5 is somewhat similar to Fig. 4 wherein the end 77 of the member 84 is positioned in accordance with the value of mean density through the conversion section 15. The end 83 is positioned in accordance with the value of mean temperature through the conversion section 15 through the agency of thermocouples 96, 97 which are so connected in the circuit of the potentiometer 79 as to position the pointer 81 and the pivot 83 according to the mean temperature, or average temperature, throughout the section 15. A pilot stem 98 is vertically positioned by the member 84 relative to two pilot housings.

Referring now to Fig. 15, I show in detail the arrangment of this special pilot assembly wherein the outlet connection 99 leads to the fuel control valve 94 while the outlet connection 100 leads to a rheostat positioner 101 controlling the speed of a fan 102 for recirculation of the products of combustion around the bridge wall. As the pilot stem 98 is moved downwardly the land 103 provides a gradually increasing gradation in pressure available at the outlet 99. Simultaneously the downward movement of the land 104 results in a gradual increase in pressure available at the outlet 100 until after a certain period of movement the land 105 has reached a position relative to the port 106 that some of the pressure in the outlet 100 begins to bleed through the port 106 to the atmosphere. The result is a sequential operation wherein continued downward movement of the stem 98 results in a gradual increase in pressure at the outlet 100 until a certain value of pressure is reached, beyond which the pressure decreases. This action occurring while the pressure in the outlet 99 is continually increasing throughout full range of travel.

In Fig. 5 a valve 107 controls the air loading pressure to the device 101 and a valve 108 controls the pressure to the valve 94. Thus either 94 or 101, or both, may be actuated automatically from a positioning of the pilot stem 98. A hand actuated valve 109 is located in the fuel supply line ahead of the automatic valve 94 to limit the maximum available fuel at the burner 2.

In operation, assuming that the mean density through the conversion section remains constant, then any deviation in mean temperature from desired established value will shift the pilot 98 to vary the recirculation of flue gases, which will in turn vary the mean temperature through the conversion section and cause a movement of the beam 84 to reset the pilot toward its previous position.

If for some reason such as pressure, rate of charge, or other variable, the mean density through the conversion section should vary, other than through a change in temperature, then I would want to establish a new mean temperature to work to. This is done by virtue of the fact that the change in mean density causes a positioning of the point 77, which in turn positions the pilot 98 to shift the speed of the fan 102, and thus vary the temperature which is observed by the pointer 81.

It is desired that the hand valve 109 on the fuel supply be so adjusted that the basic maximum supply of fuel and rate of firing may be predetermined. For example, assume that the valve 109 is so positioned as to have a maximum availability of 80% total fuel supply. It is desired that the operation normally be in some range of say 75-80% maximum available fuel, and only if the basic rate of operation of the still is to be changed is the hand valve 109 changed to shift this controllable range. The design is such that full range of travel of the valve 94 would be, for example, over a range of 75-80% available fuel, or 65-70%, etc. If normal operation is slightly below the maximum of say 80% available fuel, and as the relation of temperature and density departs from optimum condition with the temperature decreasing and the density thereby increasing, it requires an increase in the rate of recirculation up to the maximum of the recirculation and to then pick up the fuel and increase this rate of supply. After the fuel has been increased then the recirculation fan should be backed off into the controllable range of fuel.

Assume that the controllable range of fuel is 75-80% and the operation is at about 75% available fuel. When the temperature decreases and the density increases the loading pressure will first cause an increase in rate of recirculation, or in the loading effective through the line 100 to a certain value. At this point the continued movement of the pilot stem 98 will cause an increase in pressure available through the line 99, resulting in an increase in fuel supply by virtue of the valve 94 from 75% upward towards its maximum of 80%. As this increase is accomplished the land 105 comes into play and starts to decrease the pressure available through the line 100, thus backing off on the increase in recirculation. A different range of firing with the same sequential type of operation on the recirculation may be made available through positioning of the hand valve 109.

In Fig. 6 I diagrammatically illustrate another arrangement for determining the mean density and mean temperature in the conversion section 15. Herein a portion of the fluid path is brought out of the furnace housing at a point intermediate the inlet and outlet of the conversion section. An adjustable orifice 111 is located at this point in connection with a differential head meter 110 for positioning a self-synchronous transmitter 112 according to log head at this point. Interrelating the head meters 3 and 110 through the receiving mechanism 113—114 I cause the pivot point 77 to be moved in accordance with density at the location 111, representative of mean density through the section 15. At the same time I locate a thermocouple 115 at the mid point of the section 15 and indicate the temperature at this point by means of the pointer 81 and at the same time vertically position the pivot 83.

The pilot 85 is moved in accordance with the relation between density at the mid point of the section 15 and temperature at the same point in a manner as described for Fig. 4. Axial positioning of the pilot 85 controls an air loading pressure, which through the selective valves 92, 93 controls recirculation of the products of combustion by means of the damper mechanism 95 and controls the rate of fuel supply by means of the valve 94. A constant speed recirculating fan is shown, with control of recirculation through the agency of a damper positioned by the mechanism 95.

In Fig. 7 I illustrate a determination of density at a location 117 or the exit of a heating coil, and the utilization of such density determination as a loading means for back pressure control on the reaction chamber. The density at the tube outlet 117 may vary not only through variations in back pressure but also through variations in heat and for other causes within the coil. The density determination is effective to establish a new back pressure standard which the back pressure valve 119 then automatically maintains. A floating member 118 has its left-hand end positioned in accordance with value of density at the location 117. The right-hand end is positioned by a Bourdon tube 120 sensitive to pressure in the flow path between the back pressure valve 119 and the reaction chamber 121.

The diaphragm of the back pressure valve 119 is under the control of a pilot 122 normally positioned by the Bourdon tube 120 responsive to pressure in the line ahead of the valve 119. For example, should the back pressure at this point change, then the Bourdon tube responsive to such pressure will position the pilot 122 to control the valve 119 for returning the pressure to predetermined value.

The reason for determining density at location 117 is to position the left-hand end of the member 118 to establish a new back pressure standard to which the valve 119 then automatically works through the agency of the Bourdon tube 120 should said density vary from other causes, such for example as variation in firing. The principal object in maintaining a constant density at the location 117 (the outlet of the coil) is because this predicates a constant heat supply in the fluid and this is of particular importance where there is a reaction chamber in the system. If the density and correspondingly the total heat should vary through change in heating of the coil, the tendency will be toward giving the reaction chamber the same amount of heat although it may not necessarily be brought back to exactly the same amount; however, in an attempt to maintain the heat supply as uniform as possible I exert a stabilizing effect upon the entire system operation.

The density at the location 117 may vary not only through variations in back pressure, but also through variations in heating of the coil and for other causes within the coil. Assume for the moment that the density at location 117 is 10 and the back pressure at the valve 119 is 300. Now if the density (through variation in the heating or variation in some other factor or rate of charge) should increase to a value of 12, then obviously if I desire to maintain this density constant at 10 I must relieve some of the back pressure effective at the point 119. Thus I must vary the setting of the back pressure valve 119 to hold some lesser figure than 300, as for example 250. This is accomplished because the change in density from 10 to 12 at location 117 moves the left-hand end of the member 118 and thus establishes a new pressure standard to which the back pressure valve 119 must work.

The instrumentalities as above discussed in connection with Fig. 7, whereby a constant density may be maintained at location 117 or the outlet of the tube in which the fluid is heated, may also be utilized to insure a desirable heat supply in that fluid.

Accordingly, one particular field in which the present invention is particularly useful is in connection with a fluid treating system wherein the fluid, after being treated in one zone,—for instance, in a heating coil,— then passes into another zone, for example, an enlargement wherein the velocity is reduced without material change in pressure, such for instance as a chamber or an enlarged tube section, of relatively quiescent nature and wherein the fluid may or may not be subject to additional heat or treatment from an external source. The density of a fluid at the outlet of any zone wherein the fluid has been treated is a function of the change in heat content or of the total heat of that fluid irrespective of whether such heat is latent or sensible.

In the above discussion and elsewhere herein, the term "latent heat" is used to mean that heat absorbed or liberated required to maintain a substance or substances undergoing physical and/or chemical change at a constant temperature. Obviously, this "latent heat" does not include that heat necessary to maintain a substance at a constant temperature through heat interchange with other substances, but is "heats" commonly defined as—heat of cracking (the reaction of which is generally considered endo-thermic); heat of polymerization (the reaction of which is generally considered exo-thermic); heat of vaporization, transition, fusion, sublimation, reaction, solution, absorption, etc.

Such heat supply is of particular importance when the fluid is to be thereafter passed through a reaction chamber wherein certain phenomena are secured wholly as the result of the heat already contained in that fluid and without having any additional heat imparted thereto. Such control is also desirable when the treating coil does not feed into a reaction chamber; that is, when the heated fluid is passed directly to a vapor separator. Under the latter conditions, a knowledge of the density at the outlet of the conversion section, such as 15 of Fig. 4 permits an associated control of the total heat which is in the fluid as the latter passes into a vapor separator; in other words, when the reaction chamber shown in Fig. 7 is omitted.

It has been found, for instance, that this control is of particular value when the residuum from the vapor separator is withdrawn to a vacuum unit for further treatment because even under these conditions it is possible closely to control the heat which governs the distillation effected in the vapor separator. Under either of the last-discussed conditions the control as to pressure would be as shown in Fig. 8.

In some industries, (following the terminology of the petroleum industry) the second zone is termed a "reaction" chamber, wherein without further treatment, as for instance without further heat being imparted to the fluid, the latter undergoes a change of condition. It has always been difficult in the past, because of the lack of some control element whereby, what was occurring, could be observed as "news rather than history," so to treat, that is, so to apply heat to a fluid in a treating zone (such as a heating section), that optimum operating conditions would exist in another zone to which the fluid (after being treated) is passed, such for instance as the just described enlarged zone, whether the latter is a "reaction" chamber or merely a section in which the tubing is of enlarged diameter as compared with the diameter of the heating section tubing.

Another form of fluid treating apparatus to which the present invention is applicable is one wherein, after the fluid has been treated in a zone, such as a heating coil, it passes to a coil of enlarged diameter, or one wherein the velocity is reduced without material change in pressure. Such apparatus and system differs from the hereinbefore described reaction chamber system only in that heat is imparted to the fluid from an external source. For example, in Fig. 4 the fluid leaving coil 14 passes into coil 15 in which latter additional heat is imparted to the fluid and wherein the device 4—12A is utilized in the determination of density of the fluid leaving the zone 14. In some cases a pipe in a section, such as 15, may be of greater diameter than a pipe in the section 14, and in other cases it may be the same.

It will be understood, therefore, that through the instrumentality of the present invention as applied in the present instance, one may use the determined density in arriving at the total heat or change in heat in a fluid irrespective of the character of that heat and utilize this determination in controlling the operation of the fluid treating system, either so far as causing the heat to exist in the treated fluid or thereafter utilizing the heat which does exist therein.

Certain features in connection with the heat-density relation and utilization thereof, disclosed but not claimed herein, are disclosed and claimed in the copending application of Robert L. Rude, Serial No. 152,860 filed July 9, 1937. That is, it will be understood that, as to such methods and apparatus as are not herein claimed, the same are covered in the copending application of Robert L. Rude, Serial No. 152,860.

In the event that the treating coil is not equipped with a reaction chamber but feeds directly to a separator, it may be desirable to control the density at the outlet of the coil for the purpose of controlling the total heat to the vapor separator. This is particularly important in the event that the residuum from the vapor separator is being withdrawn to a vacuum unit for further reduction to specification asphalt, inasmuch as such heat control governs the distillation effected in the vapor separator. In Fig. 8 I show a modification of Fig. 7 wherein the arrangement is similar to that of Fig. 7 except that the reaction chamber is herein omitted.

In Fig. 9 I show an arrangement for the determination of density which may then be used for hand or automatic control of the firing. A charge tank 123 is provided with a float 124 and indicator 125 by means of which the weight rate of charge pumped by the pump 126 through the fluid path 1 is determined. The pump is of a constant speed type but variable to the extent that its speed may be changed and thereafter it will run at the newly established speed. Thus readings on the indicator 125 over a definite period of time give an indication of rate of flow in terms of weight or volume. Provision is shown for sampling the charge to determine the specific gravity or density. An adjustable orifice 127 and differential head meter 128 are related to the outlet of the path 1, following a condition change of the fluid, such as occurs by heating through the agency of the burner 2. Hand control of the fuel supply may be had by the valve 129 and of the air to support combustion through the mechanism 130.

Assuming that the specific gravity or density of the charge remains constant, I then utilize the tank gaging and the reading of the head meter 128 in determining the density of the fluid passing the adjustable orifice 127.

$$d_{127} = K \frac{W^2}{h_{127}}$$

where

K = a constant including value of sp. gr. of the charge
W = weight rate by tank gaging and $h_{127}$ = differential head across adjustable orifice 127

Fig. 10 relates to Fig. 3 showing diagrammatically the determination of time of detention or treatment in the conversion section and its utilization in control of the firing and of the rate of charge. The motion transmitted from the receiving mechanism 35—36 passes through a gear box 131 including the antilog cam 61 to position an indicator 132 relative to a chart 133 to read in terms of time of detention. If either rate of charge as represented by movement of the transmitter 22, or mean density as represented by position of the transmitter 26, should vary, then the time of treatment indicated by 132 will vary.

$$T = \frac{Vmd}{W}$$

The indicator arm 132 positions a pilot 133A to establish an air loading pressure effective in positioning the firing control valve 94 and the rate of charge control valve 134 selectively through the valves 135, 136. Should mean density vary for example as by heating, temperature, pressure, etc., then the rate of charge may be controlled to return the time of detention to the desired value.

In Fig. 11 I interrelate the time of detention and the temperature of the conversion section. The drawing is supplemental to Fig. 10 and does not duplicate in Fig. 11 that which is common to the two, namely the head meters and the mechanism necessary to position the indicator 132 responsive to time of detention.

A link 137 is pivotally suspended from the arm 132 and positions the right-hand end of a floating beam 138 in accordance with value of time of detention. The left-hand end of the beam 138 is continually positioned in accordance with the mean or average of the temperatures at the inlet and outlet of the conversion section 15. At the inlet to the conversion section I locate a gas filled thermometer bulb 139 effective in positioning a Bourdon tube 140 according to temperature at location 139. In a similar manner a gas filled bulb 141 is sensitive to temperature at the outlet to the conversion section and positions a Bourdon tube 142. The Bourdon tubes 140, 142 are mechanically connected to position the left-hand end of the floating member 138 in accordance with the mean or average of the two temperatures.

Pivotally suspended intermediate the ends of the member 138 is a pilot 143 effective in establishing an air loading pressure representative of time-temperature relation. Such air loading pressure may be effective in positioning the fuel control valve 94 and the rate of charge control valve 134 selectively through the valves 135, 136.

Fig. 12 is related to Figs. 10 and 11 and does not duplicate therein that which is common to the three figures. For example, the floating beam 138 is continually positioned in accordance with time of detention and mean temperature as explained for Fig. 11.

Pivotally suspended from the member 138 is a link 144 adapted to position member 145 in proportion to the movement of the member 144 dependent upon the adjustment 146. Adjustment 146 is for stock factor variations including such variables in the charge fluid as specific gravity, Anilin number, etc. It will be understood that this adjustment 146 for stock factor is a hand actuated compensation in this illustration and that values of specific gravity, Anilin number, etc. of the charging stock must be determined by sampling, or similar manner, so that the adjustment to the time-temperature relation may be made through the agency of this adjustment 146. Movement of the pointer 144A (which is fastened to and positioned with the link 144) indicates the value of time of detention-temperature relation relative to the index 144B. For a given stock factor the index 144B may be graduated in terms of yield per pass. The indicator 145 however indicates relative to the index 145A continuously in terms of yield per pass as its movement takes into account not only the value of time-temperature relation but also the stock factor adjustment 146. The value of stock factor to which the adjustment 146 is set may be read from the index 146A.

The mechanism indicated at 147 in relation to the charge line may comprise a continuous or intermittent measurement of these variables, which may be automatically applied at point 146 to automatically introduce a correction for varying stock factor to the time-temperature relation for a result indicated by the member 145 directly in terms of yield per pass. The member 145 then is adapted to position a pilot 148 for control of the firing valve 94 and/or the rate of charge control valve 134.

In Fig. 13 I illustrate a further arrangement for the control of fuel and air supplied for combustion, from separate determinations of density at the inlet and at the exit of the conversion section. An indicator 148 is adapted to indicate and record continuously the value of the fluid density at the exit of the conversion section, while an indicator 149 is adapted to indicate and record continuously the value of the fluid density at the inlet to the conversion section 15. Each of the two indicators 148, 149 is arranged to establish an air loading pressure utilized in the control of the firing. That established by the indicator 149 in accordance with the fluid density at the inlet to the conversion section is transmitted through a pipe 150 to the chamber 151 of a differential relay 152. That established by the indicator 148 representative of the fluid density at the exit of the conversion section is transmitted through a pipe 153 directly to the air actuator 95 and simultaneously to the chamber 154 of the relay 152.

The relay 152 is arranged to have two pair of pressure chambers separated by a flexible sealing means and each pair of chambers separated by a flexible diaphragm. The upper pair of chambers has the pressure in 151 above its diaphragm and atmospheric pressure below. The lower pair of chambers has the pressure in 154 above the diaphragm and an exit loading pressure below the diaphragm. As will be observed, the pressures in chambers 151, 154 are additive and control a pressure effective to position the valve 94 in accordance with the mean of said pressures or as the mean density $md_{15}$. The pressure representative of density at 13A is at the same time effective to position the air control means 95.

Thus the arrangement of Fig. 13 provides a control of the firing (fuel) responsive to value and variations in mean density through the conversion section or time of detention; while the supply of air to support combustion is regulated in accordance with value and variations in outlet density representative of heat content of the fluid.

In Fig. 17 I illustrate an arrangement somewhat similar to that of Fig. 13, but indicate that the loading pressure representative of density at location 13A (transmitted through pipe 153) simultaneously is effective to control fuel and air, while the loading pressure representative of density at location 12A (effective through pipe 150) readjusts the control of the air to support combustion.

The loading pressure of the pipe 153 leads directly to the diaphragm actuator of valve 94 in the fuel line and at the same time leads to chamber 151 of the pressure relay 152. The control pressure established in the chamber 156 of the relay is transmitted through a pipe 157 to the air damper actuator 95, so that the devices 94, 95 are actuated in unison by pressure and variations in pressure within the pipe 153 representative of density at location 13A.

The pressure in pipe 150 is led to a chamber 155 of the relay 152, where it acts upon one side of the diaphragm separating chambers 151 and 155 and thus modifies the primary control of the air damper. It will be observed that the air damper is under the joint control of the algebraically added pressures in chambers 151 and 155.

I thus provide a control of the elements of combustion from density at the outlet of the heating section 15 and modify the control of one of the elements of combustion from variations in density at another location in the heated fluid flow path.

While I have chosen to illustrate and describe the functioning of my invention in connection with the heating of petroleum or hydrocarbon oil, it is to be understood that the method and apparatus is equally applicable to the treatment, processing, or working of other fluids, such for example, as in the vaporization of water to form steam. If the fluid entering the conduit 1 is water, heated and/or vaporized by the heating means 2, the condition change or processing of the fluid being treated is believed to be purely a physical change.

Other fluids than water may, of course, be treated or processed, or undergo a physical condition change manifested by a change in density. The apparatus arrangements of Figs. 1 and 2 clearly exemplify the invention regardless of the type or nature of the fluid being processed and regardless as to whether the "condition change" is physical, chemical, or both, in nature. Likewise other figures of the drawings illustrate apparatus readily adaptable to the processing of fluids other than petroleum hydrocarbons and wherein the condition change may be of a strictly chemical or of a strictly physical nature, or a combination of the two.

The arrangement of Fig. 4 may be used in substantially identical arrangement wherein the fluid being processed is water admitted at the entrance of conduit 1, and it is desired to produce saturated or superheated vapor (steam) at the exit of the once-through fluid path. The qualitative condition of the steam leaving the heating section 15 is dependent upon the rate of combustion of the fuel and air supplied to the furnace; the rate of supply of which is controlled responsive to density and temperature as previously explained. The receivers 31—32 may position an indicator in accordance with density of the fluid (which may be water, steam, or water-steam mixture) at location 12A, in addition to being effective in control. Similarly the receivers 34—33 may position an indicator or recording pen in accordance with the density of the fluid at location 13A.

Referring, for example, to the arrangement of Fig. 7, if the fluid being processed is water heated and passed to the chamber 121 (in this case usually termed a flash chamber) the heated fluid entering chamber 121 may be all liquid or a liquid-vapor mixture. Upon entering the enlarged relatively quiescent zone 121 wherein there may be a reduced pressure, a considerable percentage of the liquid will flash into vapor; the vapor then passing to other apparatus.

In general, the arrangement of apparatus and method of its operation and utilization is adaptable to fluids undergoing physical, chemical or physical and chemical condition changes, so that while I have used the processing of petroleum hydrocarbon as a specific example I am not to be limited in that respect whatever.

Certain subject matter disclosed but not claimed herein, is disclosed and claimed in applicant's co-pending divisional applications Serial Nos. 220,319, 221,392 and 221,328.

What I claim as new, and desire to secure by Letters Patent of the United States, is:

1. In combination with a fluid heater having a once through fluid flow path subjected to heating, means continuously forcing a selected fluid under pressure through said path, means including flow responsive elements continuously determining mean density of the fluid in a portion of the heated fluid path, means continuously determining temperature at a location in the fluid path subjected to heating, and control means regulating the heating conjointly responsive to said second and third means.

2. In combination with a fluid treating system having a once through fluid flow path through which a selected fluid is continuously passed under pressure, means for heating said path, means determining the density of the fluid at an intermediate location in the path, means determining the density of the fluid at the exit of the path, averaging means continuously determining mean density of the fluid within the path between the said location and exit and from said determinations, and regulating means for the heating positioned responsive to magnitude and variation in said mean density.

3. In combination with a fluid heater having a once through fluid flow path, means continuously forcing a selected fluid under pressure through said path, means for heating said path, and means controlling the heating conjointly responsive to mean density and mean temperature of the flowing fluid through a portion of the path.

4. In combination with a fluid treating system having a once through fluid flow path, means continuously determining mean density of the fluid in a portion of the path, means continuously determining weight rate of fluid flow through the path, means continuously determining mean temperature of the fluid in said portion of the path, and means under the control conjointly of all three said means adapted to regulate the treatment.

5. In combination with a fluid treating system having a once through fluid flow path, means continuously determining mean density of the fluid in a portion of the path, means continuously determining weight rate of fluid flow through the path, means continuously determining mean temperature of the fluid in said portion of the path, means correlating the manifestations of said means and compensating for variable characteristics in the fluid entering the path, and regulating means for the treating under the control of said last named means.

6. In the control of furnaces for fluid heating, the method which consists in simultaneously varying the rate of supply of combustible fuel and the rate of supply of air to the furnace in response to density changes in the fluid leaving the heater, and readjusting only the rate of supply of fuel in response to variations in density of the fluid subsequent to the initiation of heating.

7. In the control of a furnace for heating a once through fluid flow path, the method which consists in simultaneously varying the rates of supply of the elements of combustion to said furnace in response to variations in density at a predetermined point in the fluid flow, and further varying only the rate of supply of but one element of combustion to said furnace in response to variations in density at another predetermined point in the fluid flow.

8. The method of controlling a closed fluid heater having surfaces heated primarily by radiation and other surfaces heated primarily by convection and supplied with the elements of combustion, which includes simultaneously varying the rates of supply of the elements of combustion to the furnace in response to variations in density of the fluid confined by convection heated surfaces, and further varying the rate of supply of one of the elements of combustion in response to variations in density of the fluid confined by radiant heated portion.

9. In combination with a once through forced flow heater having tubes connected in series, means determining fluid density near the point in the flow path where vapor begins to form, means determining fluid density at another location in the flow path, and means responsive to said density determining means and adapted to adjust heat and fluid input to the path.

10. In combination with a fluid treating system having a once through fluid flow path through which a selected fluid is continuously passed under pressure, apparatus for heating the path, means sensitive to fluid density at progressive locations along the flow path, and means responsive to said means and adapted to control both said apparatus and the rate of liquid inflow to the path to maintain density of the fluid at a selected different value in each of several predetermined sections of the fluid path.

11. In combination with a fluid heater having a once through fluid flow path, means for heating the fluid flow path, means continuously forcing a selected fluid under pressure through said path, and means responsive to density of the fluid at a plurality of different locations of the path continuously regulating the operation of the heater.

12. In combination with a forced circulation fluid treating system having an enclosed path through which a selected fluid is continuously forced under pressure, apparatus for heating the system, means including flow responsive elements determining density of the fluid at a selected location in the system, and control means for said apparatus positioned by said first means.

13. In combination with a forced circulation fluid treating system having an enclosed path through which a selected fluid is continuously forced under pressure, apparatus for heating the system, means including at least two flow responsive elements providing a manifestation of density of the fluid at a selected location in the fluid flow path, means sensitive to temperature of the fluid at said location, and control means for said apparatus positioned jointly by said first and second means.

14. In combination with a forced circulation fluid treating system having an enclosed path through which a selected fluid is continuously forced under pressure, means including flow responsive elements determining density of the fluid at a selected location in the fluid flow path, and control means positioned by said first means adapted to regulate the treating.

15. Apparatus for controlling density of a selected fluid at a location in a heated fluid flow path throughout which the fluid has a uniform weight rate of flow, comprising in combination, means indicative of density of the fluid at said location, means sensitive to pressure of the fluid at said location, and means controlling said density responsive to both said means.

16. Apparatus for controlling density of a selected fluid at a location in a heated fluid flow path throughout which the fluid has a uniform weight rate of flow, comprising in combination, means including flow responsive elements indicative of density of the fluid at said location, means sensitive to another variable condition such as temperature or pressure of the fluid at said location, and means controlling said density responsive to both said means.

17. In combination with a heater for a selected fluid having a heated forced flow fluid path throughout which the fluid has a uniform weight rate of flow, means continuously determining mean density of the fluid in a portion of the heated path, means continuously determining temperature at a location in the fluid path, and control means conjointly responsive to said first and second means adapted to regulate fluid density in the path.

18. In combination with a fluid treating system having a once through enclosed fluid flow path through which a selected fluid has a uniform weight rate of flow, means including flow responsive elements indicative of fluid density at a location along the path, and means responsive to said means and adapted to regulate the heating of said path to maintain the density of the fluid at said location at a selected value.

19. In combination with a fluid treating system having a once through enclosed fluid flow path throughout which a selected fluid has a uniform weight rate of flow, apparatus for heating the path, means including flow responsive elements indicative of fluid density at a location along the path, and means responsive to said means and adapted to regulate said apparatus to control the heating of said path to maintain the density of the fluid at said location at a selected value.

20. In combination with a heater for a selected fluid having a heated forced flow fluid path throughout which the fluid has a uniform weight rate of flow, means continuously determining the density of the fluid at a selected location in the heated path, means continuously determining temperature at said location in the fluid path, and control means conjointly responsive to said first and second means adapted to regulate fluid density in the path.

21. In combination with a fluid treating system having a once through fluid flow path throughout which a selected fluid has a uniform weight rate of flow, apparatus for heating the path, means including flow responsive elements continuously determining the density of the fluid at a selected location in the heated path, means continuously determining temperature at a location in the fluid path, and control means conjointly responsive to said first and second means adapted to regulate said apparatus to control the heating of said path to maintain the density of the fluid at said first named location at a selected value.

22. In combination with a fluid treating system having a once through fluid flow path throughout which a selected fluid has a uniform weight rate of flow, apparatus for heating the path, means sensitive to fluid density at progressive locations along the flow path, and means responsive to said means and adapted to control said apparatus to maintain density of the fluid at a selected different value in each of several predetermined sections of the fluid path.

23. In combination with a fluid treating system having a once through fluid flow path throughout which a selected fluid has a uniform weight rate of flow, apparatus for heating the path, means sensitive to fluid density at progressive locations along the flow path, and means responsive to said means and adapted to control rate of liquid inflow to the path to maintain density of the fluid at a selected different value in each of several predetermined sections of the fluid path.

24. In combination with a heater for a selected fluid having a once through fluid flow path throughout which the fluid has a uniform weight rate of flow, means including flow responsive elements continuously determining density of the fluid at the exit of the heater, and means responsive to said first named means adapted to maintain such density at a predetermined value.

25. In combination with a fluid treating system having a forced flow path through which a selected fluid has a uniform weight rate of flow, means sensitive to fluid density at a location along the path, and means responsive to said means and adapted to regulate both the heating and the weight rate of fluid flow to said path to maintain the density of the fluid at said location at a selected value.

26. In combination with a fluid treating system having a forced flow path through which a selected fluid has a uniform weight rate of flow, means including flow responsive elements determining fluid density at a location along the path, and means responsive to said means and adapted to regulate the treatment of the fluid in said path to maintain the density of the fluid at said location at a selected value.

27. Apparatus for controlling the operation of a fluid treating system wherein a portion of the entering liquid is vaporized, comprising in combination, means for forcing the fluid under pressure through the treating system in a forced circulation path, a relatively quiescent separator zone of the path to which the liquid and vapor mixture passes, means obtaining a manifestation of the in situ density of the mixture entering the zone, and means controlling the density of the mixture and responsive to said second named means.

RAYMOND D. JUNKINS.